United States Patent
Taniguchi et al.

(10) Patent No.: US 7,732,529 B2
(45) Date of Patent: Jun. 8, 2010

(54) THERMOPLASTIC ELASTOMER COMPOSITION AND MOLDED ARTICLE

(75) Inventors: Akio Taniguchi, Settsu (JP); Takeshi Chiba, Kobe (JP)

(73) Assignee: Kaneka Corporation, Osaka (JP)

( * ) Notice: Subject to any disclaimer, the term of this patent is extended or adjusted under 35 U.S.C. 154(b) by 232 days.

(21) Appl. No.: 10/587,472

(22) PCT Filed: Jan. 24, 2005

(86) PCT No.: PCT/JP2005/000823

§ 371 (c)(1),
(2), (4) Date: Jul. 27, 2006

(87) PCT Pub. No.: WO2005/073269

PCT Pub. Date: Aug. 11, 2005

(65) Prior Publication Data

US 2007/0123651 A1      May 31, 2007

(30) Foreign Application Priority Data

Jan. 30, 2004   (JP) ............................. 2004-023865

(51) Int. Cl.
C08F 293/00 (2006.01)
C08L 33/08 (2006.01)
C08L 33/10 (2006.01)
C08L 53/00 (2006.01)

(52) U.S. Cl. .................................... 525/94
(58) Field of Classification Search .................. 525/94
See application file for complete search history.

(56) References Cited

U.S. PATENT DOCUMENTS 5,976,289 A * 11/1999 Kawakubo et al. ............ 156/78
6,576,691 B2 * 6/2003 Nakashima et al. .......... 524/101
2003/0100675 A1 * 5/2003 Goetz et al. ................... 525/88
2004/0147674 A1 * 7/2004 Kakeda et al. ................ 525/88

FOREIGN PATENT DOCUMENTS

| EP | 1 398 353 A1 | 3/2004 |
| EP | 1 475 397 A1 | 11/2004 |
| EP | 1 541 595 A1 | 6/2005 |
| JP | 2000-169665 A | 6/2000 |
| JP | 2002-60449 A | 2/2002 |
| JP | 2002201244 A | 7/2002 |
| WO | WO 200402092696 | * 11/2002 |
| WO | WO 2004/013192 A1 | 2/2004 |

OTHER PUBLICATIONS

International Preliminary Report on Patentability (Chapter I of the Patent Cooperation Treaty) from Corresponding International Application No. PCT/JP2005/000823, dated Aug. 22, 2006, 5 pages.
International Search Report from Corresponding International Application No. PCT/JP2005/000823, dated Apr. 26, 2005, 1 page.
Supplementary European Search Report from Application No. EP 05 70 9267, dated Jun. 17, 2009, 3 pages.
Japanese Office Action dated Nov. 17, 2009 in Japanese Patent Application No. 2005-517429.

* cited by examiner

*Primary Examiner*—Jeffrey C Mullis
(74) *Attorney, Agent, or Firm*—Sughrue Mion, PLLC

(57) ABSTRACT

The present invention provides an acrylic block copolymer composition improving melt flowability at molding and being excellent in heat resistance in addition to keep weather resistance, chemical resistance, adhesion property, flexibility and abrasion resistance which are the characteristics of the acrylic block copolymer. It is attained by a thermoplastic elastomer composition comprising an acrylic block copolymer (A) which comprises a methacrylic polymer block (a) and an acrylic polymer block (b), wherein at least one of polymer blocks among the methacrylic polymer block (a) and the acrylic polymer block (b) has an acid anhydride group and/or a carboxyl group, and an acrylic polymer (B) having 1.1 or more of epoxy groups in one molecule.

16 Claims, No Drawings

THERMOPLASTIC ELASTOMER COMPOSITION AND MOLDED ARTICLE

This application is a national stage of PCT application PCT/JP2005/000823 filed on Jan. 24, 2005, claiming priority based on Japanese Application No. 2004-023865 filed on Jan. 30, 2004, the contents of which are incorporated herein by reference in their entirety.

TECHNICAL FIELD

The present invention relates to a thermoplastic elastomer composition excellent in moldability, heat resistance, weather resistance, chemical resistance, adhesivity, flexibility and abrasion resistance. Further, the present invention relates to a composition for powder slash molding and a powder slash molded article using the composition.

BACKGROUND ART

It is known that an acrylic block copolymer having methyl methacrylate as a hard segment and butyl acrylate as a soft segment has properties as a thermoplastic elastomer. For example, the mechanical properties of an acrylic block copolymer having a methacryl block and an acryl block which is produced by an iniferter method are disclosed (Patent Reference 1).

The acrylic block copolymer has characteristics excellent in weather resistance, heat resistance, durability, oil resistance and abrasion resistance. Further, an elastomer which is extremely soft in comparison with other thermoplastic elastomers such as a styrene block copolymer can be provided by suitably selecting components composing the block copolymer.

As uses making use of the properties of the acrylic block copolymer, there has been expected development as various superficial skin materials, interior materials, and a material for a part which is directly touched by a hand making use of smooth feeling thereof.

As physical properties necessary for these superficial skin materials, there are resistance to chemicals which may be possibly contacted, further, the adhesivity of superficial skin with a substrate when the superficial skin and the substrate are directly adhered, the adhesivity of the superficial skin with a buffer material when the buffer material is provided between the superficial skin and the substrate, in addition to mechanical properties, scratch resistance, heat resistance, strain restorability. As the molding method of the superficial skin materials, the powder slash molding using soft powder material which is a powder molding method is widely adopted for the superficial skin of interior equipments for an automobile such as an instrument panel, a console box and a door trim. This is caused by that they have soft texture, skin crepe and stitch can be provided, further, the degree of freedom in design is large, and designing property is satisfactory. Since a forming pressure is not applied in the molding method, differing from other molding methods such as injection molding and compression molding, it is a condition that powder flowability is excellent because the powder material is required to be uniformly adhered on a mold with a complicated shape at molding and simultaneously, it is also a condition that melt viscosity is low because powder adhering on a mold is melted and a film is required to be formed by flowing under no pressure. As the material, a polyvinyl chloride sheet has been conventionally widely used because it is excellent in hardness of a surface in use and flexibility, but since a polyvinyl chloride resin contains a lot of chlorine in its molecules, there is fear of great adverse effect on environments and an effective substitute material is desired (Patent Reference 2). Accordingly, a sheet molded article of a thermoplastic elastomer has been conventionally developed as the substitution of the polyvinyl chloride resin (Patent Reference 3, Patent Reference 4, and Patent Reference 5). However, sheets using a polyolefin resin and a styrene elastomer are insufficient in abrasion resistance, flexibility and oil resistance. Further, a sheet using thermoplastic polyurethane was poor in moldability, and also has a problem from the viewpoint of the cost thereof.

Patent Reference 1: Japanese Patent No. 2553134
Patent Reference 2: JP-A-5-279485
Patent Reference 3: JP-A-7-82433
Patent Reference 4: JP-A-10-30036
Patent Reference 5: JP-A-2000-103957

DISCLOSURE OF INVENTION

An object of the present invention is to obtain an acrylic block copolymer composition improving melt flowability at molding and being excellent in heat resistance in addition to maintain weather resistance, chemical resistance, adhesivity, flexibility and abrasion resistance which are the characteristics of the acrylic block copolymer.

As a result of repeating intensive studies in order to solve the above-mentioned problems, the present inventors have found that the problems can be effectively solved by converting the acrylic block copolymer to having a high molecular weight or crosslinking the acrylic block copolymer at molding, and reached the present invention.

Namely, the present invention relates to a thermoplastic elastomer composition comprising an acrylic block copolymer (A) which comprises a methacrylic polymer block (a) and an acrylic polymer block (b), wherein at least one of polymer blocks among the methacrylic polymer block (a) and the acrylic polymer block (b) has an acid anhydride group and/or a carboxyl group, and an acrylic polymer (B) having 1.1 or more of epoxy groups in one molecule.

A preferable embodiment relates to the thermoplastic elastomer composition, wherein the acid anhydride group and/or the carboxyl group exist in the main chain of the acrylic block copolymer (A) and the acid anhydride group is represented by the general formula (1):

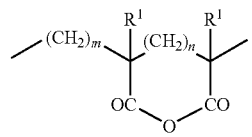

(Wherein $R^1$ is hydrogen or a methyl group and may be the same or different. n is an integer of 0 to 3 and m is an integer of 0 or 1).

A preferable embodiment relates to the thermoplastic elastomer composition, wherein the acrylic block copolymer (A) comprises 10 to 60% by weight of the methacrylic polymer block (a) in which a methacrylic polymer is the main component and 90 to 40% by weight of the acrylic polymer block (b) in which an acrylic polymer is the main component.

A preferable embodiment relates to the thermoplastic elastomer composition, wherein the acrylic polymer block (b) comprises 50 to 100% by weight of at least one monomer selected from the group consisting of n-butyl acrylate, ethyl acrylate and 2-methoxyethyl acrylate and 50 to 0% by weight of other acrylate ester and/or other vinyl monomer copolymerizable with these monomers.

A preferable embodiment relates to the thermoplastic elastomer composition, wherein the number average molecular weight measured by gel permeation chromatography of the acrylic block copolymer (A) is 30,000 to 200,000.

A preferable embodiment relates to the thermoplastic elastomer composition, wherein a ratio (Mw/Mn) of the weight average molecular weight (Mw) to the number average molecular weight (Mn) measured by gel permeation chromatography of the acrylic block copolymer (A) is 1.8 or less.

A preferable embodiment relates to the thermoplastic elastomer composition, wherein the acrylic block copolymer (A) is a block copolymer produced by atom transfer radical polymerization.

A preferable embodiment relates to the thermoplastic elastomer composition, wherein the glass transition temperature of the methacrylic polymer block (a) is 25 to 130° C.

A preferable embodiment relates to the thermoplastic elastomer composition, wherein the weight average molecular weight of the acrylic polymer (B) is 30,000 or less.

A preferable embodiment relates to the thermoplastic elastomer composition, wherein a glass transition temperature of the acrylic polymer (B) is 100° C. or less.

A preferable embodiment relates to the thermoplastic elastomer composition, wherein the acrylic polymer (B) comprises 50 to 100% by weight of at least one monomer selected from the group consisting of n-butyl acrylate, ethyl acrylate and 2-methoxyethyl acrylate and 50 to 0% by weight of other acrylate ester and/or other vinyl monomer copolymerizable with these monomers.

A preferable embodiment relates to the thermoplastic elastomer composition, wherein the weight average molecular weight of the acrylic polymer (B) is 500 to 10,000.

A preferable embodiment relates to the thermoplastic elastomer composition, wherein viscosity of the acrylic polymer (B) is 35,000 mPa·s or less.

A preferable embodiment relates to the thermoplastic elastomer composition, wherein 5 to 200 parts by weight of a filler is further added based on 100 parts by weight of the acrylic block copolymer.

A preferable embodiment relates to the thermoplastic elastomer composition, wherein 0.1 to 20 parts by weight of a lubricant is further added based on 100 parts by weight of the acrylic block copolymer.

The present invention relates to a thermoplastic elastomer composition for powder slash molding, comprising the above-mentioned composition.

The present invention relates to a molded article, which is obtained by powder slash molding the above-mentioned composition.

The present invention relates to a superficial skin for an automobile interior, which is obtained by powder slash molding the above-mentioned composition.

EFFECT OF THE INVENTION

An acrylic block copolymer composition excellent in moldability and heat resistance in addition to maintain weather resistance, chemical resistance, adhesivity, flexibility and abrasion resistance, which are the characteristics of an acrylic block copolymer, can be obtained by using the present invention. Further, the composition of the present invention can be preferably used for powder slash molding.

BEST MODE FOR CARRYING OUT THE INVENTION

The present invention is further explained in detail in the following.

The present invention is characterized in comprising an acrylic block copolymer (A) which comprises a methacrylic polymer block (a) and an acrylic polymer block (b), wherein at least one of polymer blocks among the methacrylic polymer block (a) and the acrylic polymer block (b) has an acid anhydride group and/or a carboxyl group, and an acrylic polymer (B) having 1.1 or more of epoxy groups in one molecule. The acid anhydride group and/or the carboxyl group are usually reacted with the epoxy group at molding, whereby the acrylic block copolymer (A) is converted to having a high molecular weight or crosslinked.

<Acrylic Block Copolymer (A)>

The structure of the acrylic block copolymer (A) of the present invention is a linear block copolymer or a branched (star shape) block copolymer and a mixture thereof. The structure of the block copolymer may be used depending on the physical properties of the acrylic block copolymer (A) required, but the linear block copolymer is preferable from the viewpoints of cost and easiness of polymerization. The linear block copolymer may be any structure. When the methacrylic polymer block (a) is represented as "a" and the acrylic polymer block (b) is represented as "b", it is preferable that at least one acrylic block copolymer selected from the group consisting of $(a-b)_n$ type, $b-(a-b)_n$ type and $(a-b)_n-a$ type (n is an integer of at least 1, for example, an integer of 1 to 3), from the viewpoint of the physical properties of the linear block copolymer or the physical properties of the composition. It is not particularly limited, but among those, an a-b type diblock copolymer, an a-b-a type triblock copolymer, or a mixture thereof is preferable from the viewpoints of easiness of handling at processing and the physical properties of the composition.

It is characteristic that at least one of the acid anhydride group and/or the carboxyl group is introduced in at least one polymer block of the methacrylic polymer block (a) and the acrylic polymer block (b). When its number is 2 or more, the mode in which the monomer is polymerized may be random copolymerization or block copolymerization. When the a-b-a type triblock copolymer is represented as an example, any of a (a/z)-b-a type, a (a/z)-b-(a/z) type, a z-a-b-a type, a z-a-b-a-z type, an a-(b/z)-a type, an a-b-z-a type, an a-z-b-z-a type, a (a/z)-(b/z)-(a/z) type, and a z-a-z-b-z-a-z type may be satisfactory. Herein z represents a monomer or a polymer block containing an acid anhydride group and/or a carboxyl group, (a/z) represents that a monomer containing an acid anhydride group and/or a carboxyl group is copolymerized with the methacrylic polymer block (a) and (b/z) represents that a monomer containing an acid anhydride group and/or a carboxyl group is copolymerized in the acrylic polymer block (b).

Further, a site containing z and a mode of containing z in the methacrylic polymer block (a) or the acrylic polymer block (b) may be freely set, and can be used in accordance with a purpose.

The number average molecular weight of the acrylic block copolymer (A) is not particularly limited, and may be determined from molecular weight respectively necessary for the methacrylic polymer block (a) and the acrylic polymer block (b). When the molecular weight is small, there may be a case where mechanical properties enough as an elastomer cannot be expressed, and adversely when the molecular weight is large more than necessity, there may be a case where processing property is lowered. Since flowage under non pressurization is required in particular in case of the powder slash molding, when the molecular weight is large, melt viscosity is enhanced and moldability tends to be deteriorated. From the above-mentioned viewpoint, the number average molecular weight of the acrylic block copolymer (A) is preferably 30,000 to 200,000, more preferably 35,000 to 150,000, and further preferably 40,000 to 100,000.

The ratio (Mw/Mn) of the weight average molecular weight to the number average molecular weight measured by gel permeation chromatography of the acrylic block copolymer (A) is not particularly limited, but is preferably 1.8 or less and more preferably 1.5 or less. When Mw/Mn exceeds 1.8, there may be a case where uniformity of the acrylic block copolymer is deteriorated.

The composition ratio of the methacrylic polymer block (a) to the acrylic polymer block (b) which form the acrylic block copolymer (A) is 5 to 90% by weight of the block (a) and 95 to 10% by weight of the block (b). The range of the composition ratio is preferably 10 to 60% by weight of (a) and 90 to 40% by weight of (b), and further preferably 15 to 50% by weight of (a) and 85 to 50% by weight of (b) from the viewpoints of retention of a shape at molding and elasticity as an elastomer. When the proportion of (a) is less than 5% by weight, the shape tends to be hardly retained at molding and when the proportion of (b) less than 10% by weight, elasticity as an elastomer and melting property at molding tend to be lowered.

Since when the proportion of (a) is small, hardness tends to be low and when the proportion of (b) is small, hardness tends to be high, from the viewpoint of hardness of the elastomer composition, the proportion can be set according to the hardness of the required elastomer composition. Further, since when the proportion of (a) is small, viscosity tends to be low, and when the proportion of (b) is small, viscosity tends to be high, from the viewpoint of the processing, the proportion can be set according to the required processing property.

The relation of glass transition temperatures between the methacrylic polymer block (a) and the acrylic polymer block (b) which form the acrylic block copolymer (A) preferably satisfies the relation of the following formula, referring to the glass transition temperature of the methacrylic polymer block (a) as $Tg_a$ and referring to the glass transition temperature of the acrylic polymer block (b) as $Tg_b$.

$$Tg_a > Tg_b$$

The setting of the glass transition temperature (Tg) of the above-mentioned polymer (the methacrylic polymer block (a) and acrylic polymer block (b)) can be carried out by setting the weight ratio of a monomer at respective polymer portions according to the following Fox formula.

$$1/Tg = (W_1/Tg_1) + (W_2/Tg_2) + \cdots + (W_m/Tg_m)$$

$$W_1 + W_2 + \cdots + W_m = 1$$

Wherein Tg represents the glass transition temperature of a polymer portion and $Tg_1$, $Tg_2$, - - -, $Tg_m$ represent the glass transition temperatures of respective polymerization monomers. Further, $W_1$, $W_2$, - - -, $W_m$ represent weight ratios of respective polymerization monomers.

As the glass transition temperatures of respective polymerization monomers in the above-mentioned Fox formula, for example, values described in Polymer Handbook Third Edition (Wiley-Interscience, 1989) may be used.

Further, the glass transition temperature can be measured by DSC (Differential Scanning Caloriemeter) or the tan δ peak of dynamic viscoelasticity, but when polarity between the methacrylic polymer block (a) and the acrylic polymer block (b) is too near and the chain number of block monomers is too little, there may be a case where those measurement values are deviated from the calculation formula by the above-mentioned Fox formula.

<Acid Anhydride Group and Carboxyl Group>

In the present invention, the acid anhydride group and carboxyl group are enough to act as a reaction point with the acrylic polymer (B), preferably acts as a reaction point for converting a block copolymer to having a high molecular weight or a crosslinking point for crosslinking the block copolymer. Either of the acid anhydride group and the carboxyl group may be contained in the acrylic block copolymer (A), and both of them may be contained together. It may be suitably selected from the viewpoints such as easiness of the reaction, easiness of the introduction to the acrylic block copolymer (A), and cost thereof.

The acid anhydride group and carboxyl group are introduced into the block copolymer by a form protecting the functional group with an appropriate protecting group or a form of the precursors of the acid anhydride group and the carboxyl group and then, the acid anhydride group and the carboxyl group can be also prepared by known chemical reactions.

The acid anhydride group and the carboxyl group may be contained in only one block of either of the methacrylic polymer block (a) and the acrylic polymer block (b), may be contained in both blocks, and can be used so that the introduction condition of the acid anhydride group and the carboxyl group is preferable in accordance with purposes such as the reaction point of the acrylic block copolymer (A), the cohesive force and glass transition temperature of the block (the methacrylic polymer block (a) and the acrylic polymer block (b)) composing the acrylic block copolymer (A) and further the required physical property of the acrylic block copolymer (A).

For example, when the methacrylic polymer block (a) and the acrylic polymer block (b) are wanted to be selectively reacted with the acid anhydride group and the carboxyl group as reaction points using the acrylic polymer (B) which has reactivity with the acid anhydride group and the carboxyl group, the acid anhydride group and the carboxyl group may be introduced in blocks to be reacted.

Further, the acid anhydride group and/or the carboxyl group may be introduced in the methacrylic polymer block (a) from the viewpoints of the improvement of heat resistance and thermal decomposition resistance of the acrylic block copolymer (A), and the acid anhydride group and/or the carboxyl group may be introduced into the acrylic polymer block (b) as reaction points from the viewpoints of imparting oil resistance, further rubber elasticity and compression set durability to the acrylic block copolymer (A). Not particularly limited, it is preferable that either of the block of the methacrylic polymer block (a) or the acrylic polymer block (b) has the acid anhydride group and/or the carboxyl group from the viewpoints of the control of reaction points, heat resistance, rubber elasticity, mechanical strength, and flexibility.

The content number of the acid anhydride group and/or the carboxyl group is varied depending on the cohesive force and reactivity of the acid anhydride group and/or the carboxyl group, the structure and composition of the acrylic block copolymer (A), the number of blocks composing the acrylic block copolymer (A), the glass transition temperature, and the site at which the acid anhydride group and/or the carboxyl group is contained and the mode thereof. Consequently, it may be set according to necessity, and preferably 1.0 or more per one molecule of the block copolymer, and more preferably 2.0 or more. When the number is less than 1.0, the improvement of heat resistance by converting to having a high molecular weight by a bimolecular reaction of the block copolymer or crosslinking tend to be insufficient.

When the acid anhydride group and/or the carboxyl group is introduced into the methacrylic polymer block (a), it is preferable to be introduced within a range in which the moldability of the acrylic block copolymer (A) is not lowered. Since flowage under no pressurization is required particularly in case of the powder slash molding, the cohesive force and the glass transition temperature Tg of the methacrylic polymer block (a) are increased by the introduction of the acid anhydride group and/or the carboxyl group; therefore, melt viscosity is increased and moldability tends to be deteriorated. Specifically, it is preferable to be introduced within a range in which the glass transition temperature Tg of the methacrylic polymer block (a) after introduction of the acid anhydride group and/or the carboxyl group is preferably 130° C. or less, more preferably 110° C. or less, and further preferably 100° C. or less.

When the acid anhydride group and/or the carboxyl group is introduced into the acrylic polymer block (b), it is preferably introduced within a range not deteriorating the flexibility, rubber elasticity and low temperature property of the acrylic block copolymer (A). When the cohesive force and the glass transition temperature Tg of the acrylic polymer block (b) are increased by introducing the acid anhydride group and/or the carboxyl group, the flexibility, rubber elasticity and low temperature property tend to be deteriorated. Specifically, it is preferable to be introduced within a range in which the glass transition temperature of the acrylic polymer block (b) after the introduction of the acid anhydride group and/or the carboxyl group is preferably 25° C. or less, more preferably 0° C. or less, and further preferably −20° C. or less.

An acid anhydride group and a carboxyl group are explained in the following.

<Acid Anhydride Group>

When a compound having an active proton is contained in the composition, the acid anhydride group is easily reacted with an epoxy group. The acid anhydride group is not particularly limited, but it may be introduced into the main chain of the acrylic block copolymer (A) and may be introduced into side chains. The acid anhydride group is the acid anhydride group of a carboxyl group, and it is preferably introduced into the main chain from the viewpoint of easiness of introduction into the acrylic block copolymer (A). Specifically, it is represented by the general formula (1). It is contained in a form represented by the general formula (1):

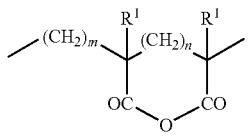

(wherein $R^1$ is hydrogen or a methyl group and may be mutually the same or different. n is an integer of 0 to 3 and m is an integer of 0 or 1).

n in the general formula (1) is an integer of 0 to 3, preferably 0 or 1 and more preferably 1. When n is 4 or more, polymerization becomes complicated or cyclization of the acid anhydride group tends to be difficult.

As the introduction method of the acid anhydride group, it is preferable to be introduced into the acrylic block copolymer in a form which is the precursor of the acid anhydride group, and thereafter cyclized. Not particularly limited, but it is preferable to melt-knead the acrylic block copolymer which has at least one unit represented by the general formula (2) to be introduced by cyclization;

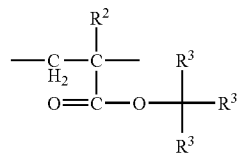

(wherein $R^2$ represents hydrogen or a methyl group. $R^3$ represents hydrogen, a methyl group or a phenyl group, at least 2 among 3 of $R^3$'s are selected from a methyl group and/or a phenyl group and 3 of $R^3$'s may be mutually the same or different).

The introduction of the unit represented by the general formula (2) to the acrylic block copolymer can be carried out by copolymerizing an acrylic acid ester or a methacrylic acid ester monomer derived from the general formula (2). Examples of the monomer are t-butyl (meth)acrylate, isopropyl (meth)acrylate, α,α-dimethylbenzyl (meth)acrylate, α-methylbenzyl (meth)acrylate, but is not limited thereto. Among those, t-butyl (meth)acrylate is preferable from the viewpoints such as availability, easiness of polymerizability, and easiness of generating the acid anhydride group.

For the formation of the acid anhydride group, the acrylic block copolymer having the precursor of the acid anhydride group is preferably heated under high temperature and preferably heated at 180 to 300° C. When the temperature is lower than 180° C., generation of the acid anhydride group tends to be insufficient, and when it is higher than 300° C., the acrylic block copolymer in itself having a precursor of the acid anhydride group tends to be decomposed.

<Carboxyl Group>

The carboxyl group is easily reacted with an epoxy group. The carboxyl group is not particularly limited, but it may be introduced in the main chain of the acrylic block copolymer (A) or may be introduced in a side chain. The carboxyl group is preferably introduced in the main chain from the viewpoint of easiness of the introduction into the acrylic block copolymer (A).

Concerning the introduction method of carboxyl group, when a monomer having a carboxyl group does not poison a catalyst under polymerization conditions, the carboxyl group is preferably introduced directly by polymerization, and when a monomer having a carboxyl group deactivates the catalyst at polymerization, a method of introducing the carboxyl group by converting a functional group is preferable.

In the method of introducing the carboxyl group by converting a functional group, the carboxyl group is introduced into the acrylic block copolymer in the form of protecting the carboxyl group with an appropriate protecting group or in the form of a functional group being the precursor of the carboxyl group, and then the functional group can be prepared by known chemical reactions. The carboxyl group can be introduced by the method.

As the synthesis method of the acrylic block copolymer (A) having a carboxyl group, for example, there are a method by which an acrylic block copolymer containing a monomer having a functional group such as t-butyl methacrylate or trimethylsilyl methacrylate, which is the precursor of the carboxyl group, is synthesized, and the carboxyl group is formed by known chemical reactions such as hydrolysis or acid decomposition (JP-A-10-298248 and JP-A-2001-234146), and a method which a acrylic block copolymer having at least one unit represented by the general formula (2) is melt-kneaded and a carboxyl group is introduced;

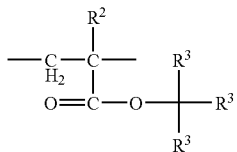

(wherein $R^2$ represents hydrogen or a methyl group. $R^3$ represents hydrogen, a methyl group or a phenyl group, at least 2 among 3 of $R^3$'s are selected from a methyl group and/or a phenyl group, and 3 of $R^3$'s may be mutually the same or different). The unit represented by the general formula (2) has a route in which a carboxyl group is generated by decomposing the ester unit under a high temperature, and successively, cyclization occurs to generate the acid anhydride group. By utilizing this, the carboxyl group can be introduced by appropriately adjusting heating temperature and time in accordance with the kind and content of the unit represented by the general formula (2).

Further, the carboxyl group can be also introduced by hydrolysis of the acid anhydride group.

<Methacrylic Polymer Block (a)>

The methacrylic polymer block (a) is a block obtained by polymerizing a monomer comprising a methacrylic acid ester as the main component, and preferably comprises 50 to 100% by weight of the methacrylic acid ester and 0 to 50% by weight of a vinyl monomer copolymerizable with this. Further, a monomer having the acid anhydride group and/or the carboxyl group may be contained as the methacrylic acid ester. When the proportion of the methacrylic acid ester is less than 50% by weight, there is a case where weather resistance which are a characteristic of the methacrylic acid ester is deteriorated.

Examples of the methacrylic acid ester composing the methacrylic polymer block (a) are methacrylic acid aliphatic hydrocarbon (for example, alkyl having 1 to 18 carbons) esters such as methyl methacrylate, ethyl methacrylate, n-propyl methacrylate, n-butyl methacrylate, isobutyl methacrylate, n-pentyl methacrylate, n-hexyl methacrylate, n-heptyl methacrylate, n-octyl methacrylate, 2-ethylhexyl methacrylate, nonyl methacrylate, decyl methacrylate, dodecyl methacrylate and stearyl methacrylate; methacrylic acid alicyclic hydrocarbon esters such as cyclohexyl methacrylate and isobornyl methacrylate; methacrylic acid aralkyl esters such as benzyl methacrylate; methacrylic acid aromatic hydrocarbon esters such as phenyl methacrylate and tolyl methacrylate; esters of methacrylic acid with alcohol containing a functional group having ethereal oxygen such as 2-methoxyethyl methacrylate and 3-methoxybutyl methacrylate; methacrylic acid fluorinated alkyl esters such as trifluoromethyl methacrylate, trifluoromethylmethyl methacrylate, 2-trifluoromethylethyl methacrylate, 2-trifluoroethyl methacrylate, 2-perfluoroethylethyl methacrylate, 2-perfluoroethyl-2-perfluorobutylethyl methacrylate, 2-perfluoroethyl methacrylate, perfluoromethyl methacrylate, diperfluoromethylmethyl methacrylate, 2-perfluoromethyl-2-perfluoroethylmethyl methacrylate, 2-perfluorohexylethyl methacrylate, 2-perfluorodecylethyl methacrylate and 2-perfluorohexadecylethyl methacrylate. At least one of these is used. Among those, methyl methacrylate is preferable from the viewpoints of processability, cost, and availability.

Examples of the vinyl monomer copolymerizable with a methacrylic acid ester composing the methacrylic polymer block (a) are an acrylic acid ester, an aromatic alkenyl compound, a vinyl cyanide compound, a conjugated diene compound, a halogen-containing unsaturated compound, an unsaturated carboxylic acid compound, an unsaturated dicarboxylic acid compound, a vinyl ester compound, and a maleimide compound.

Examples of the acrylic acid ester are acrylic acid aliphatic hydrocarbon (for example, alkyl having 1 to 18 carbons) esters such as methyl acrylate, ethyl acrylate, n-propyl acrylate, n-butyl acrylate, isobutyl acrylate, n-pentyl acrylate, n-hexyl acrylate, n-heptyl acrylate, n-octyl acrylate, 2-ethylhexyl acrylate, nonyl acrylate, decyl acrylate, dodecyl acrylate and stearyl acrylate; acrylic acid alicyclic hydrocarbon esters such as cyclohexyl acrylate and isobornyl acrylate; acrylic acid aromatic hydrocarbon esters such as phenyl acrylate and tolyl acrylate; acrylic acid aralkyl esters such as benzyl acrylate; esters of acrylic acid with alcohol containing a functional group having ethereal oxygen such as 2-methoxyethyl acrylate and 3-methoxybutyl acrylate; acrylic acid fluorinated alkyl esters such as trifluoromethylmethyl acrylate, 2-trifluoromethylethyl acrylate, 2-perfluoroethylethyl acrylate, 2-perfluoroethyl-2-perfluorobutylethyl acrylate, 2-perfluoroethyl acrylate, perfluoromethyl acrylate, diperfluoromethylmethyl acrylate, 2-perfluoromethyl-2-perfluoroethylmethyl acrylate, 2-perfluorohexylethyl acrylate, 2-perfluorodecylethyl acrylate and 2-perfluorohexadecylethyl acrylate.

Examples of the aromatic alkenyl compound are styrene, α-methylstyrene, p-methylstyrene, and p-methoxystyrene.

Examples of the vinyl cyanide compound includes acrylonitrile, and methacrylonitrile.

Examples of the conjugated diene compound are butadiene and isoprene.

Examples of the halogen-containing unsaturated compound are vinyl chloride, vinylidene chloride, perfluoroethylene, perfluoropropylene, and vinylidene fluoride.

Examples of the unsaturated carboxylic acid compound are methacrylic acid and acrylic acid.

Examples of the unsaturated dicarboxylic acid compound are maleic anhydride, maleic acid, a monoalkyl ester and a dialkyl ester of maleic acid, fumaric acid, and a monoalkyl ester and a dialkyl ester of fumaric acid.

Examples of the vinyl ester compound are vinyl acetate, vinyl propionate, vinyl pivalate, vinyl benzoate, and vinyl cinnamate.

Examples of the maleimide compound are maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide.

At least one of these is used. Among those vinyl monomers, a preferable monomer can be selected from the viewpoints such as adjustment of a glass transition temperature required for the methacrylic polymer block (a), and compatibility with the acrylic polymer block (b).

The glass transition temperature of the methacrylic polymer block (a) is preferably 25 to 130° C., more preferably 40 to 110° C., and further preferably 50 to 100° C. from the viewpoints of thermal deformation and moldability of the elastomer composition.

From the above-mentioned viewpoints, the methacrylic polymer block (a) is preferably a block obtained by polymerizing methyl methacrylate as the main component, a monomer having the acid anhydride group and/or the carboxyl group and at least one monomer selected from the group consisting of ethyl acrylate, n-butyl acrylate, and 2-methoxyethyl acrylate for controlling a glass transition temperature.

$Tg_a$ of the methacrylic polymer block (a) can be set by setting a weight ratio of monomers in a polymer portion according to the above-mentioned Fox formula.

<Acrylic Polymer Block (b)>

The acrylic polymer block (b) is a block obtained by polymerizing a monomer which comprises an acrylic acid ester as the main component, and preferably comprises 50 to 100% by weight of an acrylic acid ester and 0 to 50% by weight of a vinyl monomer copolymerizable with this. Further, a monomer having the acid anhydride group and/or the carboxyl group may be contained as an acrylic acid ester. When the proportion of the acrylic acid ester is less than 50% by weight, there may be a case where the physical property of the composition, in particular, flexibility and oil resistance, which are the characteristics of using the acrylic acid ester, is damaged.

Examples of an acrylic acid ester composing the acrylic polymer block (b) are monomers similar to the acrylic acid ester, which is exemplified as a monomer composing the methacrylic polymer block (a).

These can be used alone or in combination of two or more kinds thereof. Among those, n-butyl acrylate is preferable from the viewpoint of the balance of rubber elasticity, property at low temperature and cost. When oil resistance and mechanical property are required, ethyl acrylate is preferable. Further, when imparting low temperature property and oil resistance and improvement of surface tackiness of a resin are required, 2-methoxyethyl acrylate is preferable. Further, when the balance of oil resistance and the low temperature property is required, a combination of ethyl acrylate, n-butyl acrylate, and 2-methoxyethyl acrylate is preferable.

Example of the vinyl monomer copolymerizable with an acrylic acid ester composing the acrylic polymer block (b) are a methacrylic acid ester, an aromatic alkenyl compound, a vinyl cyanide compound, a conjugated diene compound, a halogen-containing unsaturated compound, a silicon-containing unsaturated compound, an unsaturated carboxylic acid compound, an unsaturated dicarboxylic acid compound, a vinyl ester compound, and a maleimide compound. Specific examples thereof are those same as the above-mentioned compounds used for the methacrylic polymer block (a).

At least one of these is used. Among those vinyl monomers, a preferable monomer can be selected from the viewpoint of the balance of glass transition temperature and oil resistance required for the acrylic polymer block (b), and compatibility with the methacrylic polymer block (a). For example, acrylonitrile can be copolymerized for the purpose of improving oil resistance of the composition.

The glass transition temperature of the acrylic polymer block (b) is preferably at most 25° C., more preferably at most 0° C., and further preferably at most −20° C. from the viewpoint of rubber elasticity of the elastomer composition. When the glass transition temperature of the acrylic polymer block (b) is higher than the temperature of environment in which the elastomer composition is used, it is not advantageous because rubber elasticity is hardly expressed.

From the above-mentioned viewpoints, the acrylic polymer block (b) is preferably a block obtained by polymerizing the acid anhydride group and/or the carboxyl group and a monomer comprising at least one monomer selected from the group consisting of n-butyl acrylate, ethyl acrylate and 2-methoxyethyl acrylate as the main component.

$Tg_b$ of the acrylic polymer block (b) can be set by setting the weight ratio of each of monomers in a polymer according to the above-mentioned Fox formula.

<Preparation Process of Acrylic Block Copolymer (A)>

The process for preparing the acrylic block copolymer (A) is not particularly limited, but controlled polymerization using an initiator for a polymer is preferably used. Examples of the controlled polymerization are living anion polymerization, radical polymerization using a chain transfer agent and living radical polymerization which has been recently developed. Among those, the living radical polymerization is preferable from the viewpoint of controlling a molecular weight and a structure of the acrylic block copolymer.

The living radical polymerization is radical polymerization in which activity of the terminal of polymerization is maintained without losing. The living polymerization indicates polymerization in which the terminal always continues to have activity in the narrow sense, but in general, pseudoliving polymerization in which the terminal deactivated and the terminal activated are in equilibrium state is also included. The definition herein is also applied to the latter. Recently, the living radical polymerization has been actively studied by various groups.

Example of the living radical polymerization are those using a chain transfer agent such as polysulfide, those using a cobalt porphyrin complex (J. Am. Chem. Soc., 1994, Vol. 116, page 7943), those using a radical capturing agent such as a nitroxide compound (Macromolecules, 1994, Vol. 27, page 7228), and Atom Transfer Radical Polymerization (ATRP) using a transition metal complex as a catalyst and organic halogenated compound as an initiator. In the present invention, there is no limitation for which method is used, but the Atom Transfer Radical Polymerization is preferable from the viewpoint of easiness of control.

The Atom Transfer Radical Polymerization is carried out by using an organic halogenated compound or a halogenated sulfonyl compound as an initiator and a metal complex in which Group VII, Group VIII, Group IX, Group X or Group XI element of the Periodic Table is used as a central metal, as a catalyst (for example, refer to Matyjaszewski et. al., J. Am. Chem. Soc., 1995, Vol. 117, page 5614, Macromolecules, 1995, Vol. 28, page 7901, Science, 1996, Vol. 272, page 866 or Sawamoto et. al., Macromolecules, 1995, Vol. 28, page 1721).

According to the method, in general, even though it is radical polymerization in which polymerization speed is very high and a termination reaction such as the coupling of mutual radicals easily occurs, but the polymerization livingly proceeds, a polymer with narrow molecular weight distribution (Mw/Mn=1.1 to 1.5) is obtained and a molecular weight can be freely controlled by changing the ratio of a monomer and an initiator.

In the Atom Transfer Radical Polymerization, as the organic halogenated compound or halogenated sulfonyl compound as an initiator, monofunctional, bifunctional or multifunctional compounds can be used. These may be used in accordance with its purpose, but when a diblock copolymer is produced, a monofunctional compound is preferable from the viewpoint of easy availability of an initiator. When a triblock copolymer of a-b-a type and a triblock copolymer of b-a-b type are produced, a bifunctional compound is preferably used from the viewpoint of reducing the number of reaction steps and time. When a branched block copolymer is produced, a multifunctional compound is preferably used from the viewpoint of reducing the number of reaction steps and time.

Further, a macroinitiator can be also used as the above-mentioned initiator. The polymer initiator is a compound comprising a polymer in which a halogen atom is bonded at the terminal of a molecule, among the organic halogenated compound or the halogenated sulfonyl compound. Since such macroinitiator can be also produced by the controlled polymerization method other than the living radical polymerization process, there is a characteristic that a block copolymer bonded with a polymer obtained by a different polymerization process is obtained.

Examples of the monofunctional compound are compounds represented by $C_6H_5$—$CH_2X$,
$C_6H_5$—$C(H)(X)$—$CH_3$,
$C_6H_5$—$C(X)(CH_3)_2$,
$R^4$—$C(H)(X)$—$COOR^5$,
$R^4$—$C(CH_3)(X)$—$COOR^5$,
$R^4$—$C(H)(X)$—$CO$—$R^5$,
$R^4$—$C(CH_3)(X)$—$CO$—$R^5$, and
$R^4$—$C_6H_4$—$SO_2X$.

Wherein, $C_6H_5$ represents a phenyl group and $C_6H_4$ represents a phenylene group (it may be either of ortho substitution, meta substitution and para substitution). $R^4$ represents a hydrogen atom, an alkyl group having 1 to 20 carbons, an aryl group having 6 to 20 carbons or an aralkyl group having 7 to 20 carbons. X represents chlorine, bromine or iodine. $R^5$ represents a monovalent organic group having 1 to 20 carbons.

As $R^4$, the specific example of an alkyl group (including a alicyclic hydrocarbon group) having 1 to 20 carbons includes a methyl group, an ethyl group, a propyl group, an isopropyl group, a n-butyl group, an isobutyl group, a tert-butyl group, a n-pentyl group, a n-hexyl group, a cyclohexyl group, a n-heptyl group, a n-octyl group, a 2-ethylhexyl group, a nonyl group, a decyl group, a dodecyl group, and an isobornyl group. The specific example of an aryl group having 6 to 20 carbons includes a phenyl group, a tolyl group, and a naphthyl group. Specific examples of an aralkyl group having 7 to 20 carbons are a benzyl group and a phenethyl group.

Specific examples of a monovalent organic group having 1 to 20 carbons being $R^5$ are groups similar as $R^4$.

Specific examples of the mono functional compound are tosyl bromide, methyl 2-bromopropionate, ethyl 2-bromopropionate, butyl 2-bromopropionate, methyl 2-bromoisobutyrate, ethyl 2-bromoisobutyrate, and butyl 2-bromoisobutyrate. Among those, ethyl 2-bromopropionate and butyl 2-bromopropionate are preferable from the viewpoint of easiness of controlling polymerization because they are similar as the structure of an acrylic acid ester monomer.

Examples of the bifunctional compound are compounds represented by

X—$CH_2$—$C_6H_4$—$CH_2$—X,
X—$CH(CH_3)$—$C_6H_4$—$CH(CH_3)$—X,
X—$C(CH_3)_2$—$C_6H_4$—$C(CH_3)_2$—X,
X—$CH(COOR^6)$—$(CH_2)_n$—$CH(COOR^6)$—X,
X—$C(CH_3)(COOR^6)$—$(CH_2)_n$—$C(CH_3)(COOR^6)$—X,
X—$CH(COR^6)$—$(CH_2)_n$—$CH(COR^6)$—X,
X—$C(CH_3)(COR^6)$—$(CH_2)_n$—$C(CH_3)(COR^6)$—X,
X—$CH_2$—CO—$CH_2$—X,
X—$CH(CH_3)$—CO—$CH(CH_3)$—X,
X—$C(CH_3)_2$—CO—$C(CH_3)_2$—X,
X—$CH(C_6H_5)$—CO—$CH(C_6H_5)$—X,
X—$CH_2$—COO—$(CH_2)_n$—OCO—$CH_2$—X,
X—$CH(CH_3)$—COO—$(CH_2)_n$—OCO—$CH(CH_3)$—X,
X—$C(CH_3)_2$—COO—$(CH_2)_n$—OCO—$C(CH_3)_2$—X,
X—$CH_2$—CO—CO—$CH_2$—X,
X—$CH(CH_3)$—CO—CO—$CH(CH_3)$—X,
X—$C(CH_3)_2$—CO—CO—$C(CH_3)_2$—X,
X—$CH_2$—COO—$C_6H_4$—OCO—$CH_2$—X,
X—$CH(CH_3)$—COO—$C_6H_4$—OCO—$CH(CH_3)$—X,
X—$C(CH_3)_2$—COO—$C_6H_4$—OCO—$C(CH_3)_2$—X, and
X—$SO_2$—$C_6H_4$—$SO_2$—X.

Wherein $R^6$ represents an allyl group having 1 to 20 carbons, an aryl group having 6 to 20 carbons or an aralkyl group having 7 to 20 carbons. The n represents an integer of 0 to 20. $C_6H_5$, $C_6H_4$ and X are similar as the above-description.

Specific examples of an allyl group having 1 to 20 carbons, an aryl group having 6 to 20 carbons and an aralkyl group having 7 to 20 carbons of $R^6$ are the same as the specific examples of an alkyl group having 1 to 20 carbons, an aryl group having 6 to 20 carbons or an aralkyl group having 7 to 20 carbons of $R^4$.

Specific example of the bifunctional compound are bis (bromomethyl)benzene, bis(1-bromoethyl)benzene, bis(1-bromoisopropyl)benzene, dimethyl 2,3-dibromosuccinate, diethyl 2,3-dibromosuccinate, dibutyl 2,3-dibromosuccinate, dimethyl 2,4-dibromoglutarate, diethyl 2,4-dibromoglutarate, dibutyl 2,4-dibromoglutarate, dimethyl 2,5-dibromoadipate, diethyl 2,5-dibromoadipate, dibutyl 2,5-dibromoadipate, dimethyl 2,6-dibromopimelate, diethyl 2,6-dibromopimelate, dibutyl 2,6-dibromopimelate, dimethyl 2,7-dibromosuberate, diethyl 2,7-dibromosuberate, and dibutyl 2,7-dibromosuberate. Among those, bis(bromomethyl)benzene, diethyl 2,5-dibromoadipate and diethyl 2,6-dibromopimelate are preferable from the viewpoint of the availability of raw materials.

Examples of the multifunctional compound are compounds represented by $C_6H_3$—$(CH_2$—$X)_3$,
$C_6H_3$—$(CH(CH_3)$—$X)_3$,
$C_6H_3$—$(C(CH_3)_2$—$X)_3$,
$C_6H_3$—$(OCO$—$CH_2$—$X)_3$,
$C_6H_3$—$(OCO$—$CH(CH_3)$—$X)_3$,
$C_6H_3$—$(OCO$—$C(CH_3)_2$—$X)_3$, and
$C_6H_3$—$(SO_2$—$X)_3$.

Wherein $C_6H_3$ is a trivalent phenyl group (the position of three bonding hands may be a combination of either of 1-position to 6-position) and X is the same as the above description.

Specific examples of the multifunctional compound are tris(bromomethyl)benzene and tris(1-bromoethyl)benzene, tris(1-bromoisopropyl)benzene. Among those, tris(bromomethyl)benzene is preferable from the viewpoint of the availability of raw materials.

Further, when the organic halogenated compound or halogenated sulfonyl compound having a functional group other than a group initiating polymerization is used, a polymer in which a functional group other than a group initiating polymerization is introduced at a terminal or in a molecule can be easily obtained. The functional group other than a group initiating polymerization includes an alkenyl group, a hydroxyl group, an epoxy group, an amino group, an amide group, and a silyl group.

As the organic halogenated compound or halogenated sulfonyl compound which can be used as the initiator, carbon atom with which a halogen group (a halogen atom) is bonded with a carbonyl group or a phenyl group and carbon-halogen bond is activated to initiate polymerization. An amount of the initiator used may be determined from the molar ratio with a monomer in conformity with a molecular weight of the acrylic block copolymer required. Namely, the molecular weight of the acrylic block copolymer can be controlled by what molecule of a monomer is used per 1 molecule of the initiator.

The transition metal complex used as the catalyst of the Atom Transfer Radical Polymerization is not particularly limited, but preferable examples are the complex of monovalent or zero-valent copper, the complex of bivalent ruthenium, the complex of bivalent iron and the complex of bivalent nickel.

Among those, the complex of copper is preferable from the viewpoints of cost and reaction control. Examples of the monovalent copper are cuprous chloride, cuprous bromide, cuprous iodide, cuprous cyanide, cuprous oxide, and cuprous perchlorate. Among those, cuprous chloride and cuprous bromide are preferable from the viewpoint of the control of polymerization. When the monovalent copper compound is used, 2,2'-bipyridyl compounds such as 2,2'-bipyridyl and its derivative (such as 4,4'-dinolyl-2,2'-bipyridyl and 4,4'-di(5-nolyl)-2,2'-bipyridyl); 1,10-phenanthroline compounds such as 1,10-phenanthroline and its derivative (such as 4,7-dinolyl-1,10-phenanthroline and 5,6-dinolyl-1,10-phenanthroline); polyamines such as tetramethylethylenediamine (TMEDA), pentamethyldiethylenetriamine and hexamethyl (2-aminoethyl) amine may be added as a ligand in order to enhance activation of catalyst.

Further, the tristriphenylphosphin complex ($RuCl_2(PPh_3)_3$) of bivalent ruthenium chloride is also preferable as a catalyst. When the ruthenium compound is used as a catalyst, an aluminum alkoxides may be added as an activating agent. Further, the bistriphenylphosphine complex ($FeCl_2(PPh_3)_2$) of bivalent iron, the bistriphenylphosphine complex ($NiCl_2(PPh_3)_2$) of bivalent nickel and the bistributylphosphine complex ($NiBr_2(PPh_3)_2$) of bivalent nickel are also preferable as a catalyst.

The catalyst, ligand and activator used are not particularly limited, but they may be suitably determined by the relation between reaction speed and the initiator, monomer and solvent used. For example, since it is preferable for the polymerization of acrylic monomers such as an acrylic acid ester that the growth terminal of polymer chains has a carbon-bromine bond from the viewpoint of controlling a polymerization, it is preferable that the initiator used is the organic brominated compound or brominated sulfonyl compound and the solvent is acetonitrile, and it is more preferable that a ligand such as pentamethyldiethylenetriamine is used, and a metal complex catalyst in which cupric bromide, preferably copper contained in cuprous bromide is a central metal is used. Further, since it is preferable from the viewpoint of controlling polymerization that the growth terminal of polymer chains has a carbon-chloride bond for the polymerization of methacrylic monomers such as a methacrylic acid ester, the initiator used is the organic chlorinated compound or chlorinated sulfonyl compound, and the solvent is acetonitrile or a mix solvent with toluene if necessary, and it is more preferable that a ligand such as pentamethyldiethylenetriamine is used and a metal complex catalyst in which cupric chloride, preferably copper contained in cuprous chloride is a central metal is used.

The amounts of the catalyst and ligand used may be determined from the relation between required reaction speed and the amounts of the initiator, monomer and solvent used. For example, when a polymer with a high molecular weight is obtained, the ratio of the initiator to the monomer must be smaller than a case of obtaining a polymer with low molecular weight, but in such a case, the reaction speed can be increased by increasing the catalyst and ligand. Further, when a polymer having a higher glass transition temperature than a room temperature is prepared, an appropriate organic solvent is added for enhancing stirring efficiency by lowering the viscosity of the system. Therefore, the reaction speed tends to be lowered, but in such a case, the reaction speed can be increased by increasing the catalyst and ligand.

The Atom Transfer Radical Polymerization can be carried out in non-solvent (bulk polymerization) or in various solvents. Further, when polymerization is carried out by bulk polymerization or in various solvents, the polymerization can be also stopped on the way.

As the solvent, for example, a hydrocarbon solvent, an ether solvent, a halogenated hydrocarbon solvent, a ketone solvent, an alcohol solvent, a nitrile solvent, an ester solvent, and a carbonate solvent can be used.

The hydrocarbon solvent includes benzene and toluene. The ether solvent includes diethyl ether and tetrahydrofuran. The halogenated hydrocarbon solvent includes methylene chloride and chloroform. The ketone solvent includes acetone, methyl ethyl ketone, and methyl isobutyl ketone. The alcohol solvent includes methanol, ethanol, propanol, isopropanol, and n-butanol and tert-butanol. The nitrile solvent includes acetonitrile, propionitrile, and benzonitrile. The ester solvent includes ethyl acetate and butyl acetate. The carbonate solvent includes ethylene carbonate and propylene carbonate.

One or more of the solvents mentioned above can be used.

When the solvent is used, the amount used may be suitably determined from the relation between the viscosity of the whole system and stirring efficiency required. Further, when polymerization is carried out by bulk polymerization or in various solvents, the conversion of a monomer at stopping the reaction may be suitably determined from the relation between the viscosity of the whole system and required stirring efficiency, even if the polymerization is stopped on the way.

The polymerization can be carried out in a range of 23° C. to 200° C. and preferably in a range of 50° C. to 150° C.

In order to produce the acrylic block copolymer by the polymerization, there are mentioned a method of successively adding a monomer, a method of polymerizing the next block using a polymer preliminarily synthesized, as a macroinitiator, a method of bonding polymers separately polymerized by a reaction. Either of these methods may be used and may be used in accordance with purposes. The method of successively adding a monomer is preferable from the viewpoint of simplicity and easiness of the preparation steps.

The reaction solution obtained by the polymerization contains a mixture of a polymer and the metal complex. An organic acid containing a carboxyl group or a sulfonyl group is added thereto to prepare a salt with the metal complex, and the solid of the salt with the metal complex prepared is removed by filtration, successively, impurities such as an acid remaining in the solution are removed by basic active alumina, a basic absorbent, a solid inorganic acid, an anion exchange resin and cellulose anion exchanger adsorption treatment and thereby, the solution of the acrylic block copolymer can be obtained.

The polymerization solvent and unreacted monomer are successively removed by evaporation from the polymer solution obtained in this manner, and the acrylic block copolymer is isolated. As the evaporation system, a thin film evaporation system, a flash evaporation system, a horizontal type evaporation system equipped with an extrusion screw can be used. Since the acrylic block copolymer has adhering property, efficient evaporation can be carried out by the horizontal type evaporation system equipped with an extrusion screw alone or a combination with other evaporation system among the above-mentioned evaporation systems.

<Acrylic Polymer (B)>

The acrylic polymer (B) composing the thermoplastic elastomer composition relating to the present invention is a polymer containing 1.1 or more of epoxy groups in one molecule. It improves molding flowability as a plasticizer at molding the composition, and simultaneously reacts with the acid anhydride group and/or the carboxyl group in the acrylic block copolymer (A), and can convert the acrylic block copolymer (A) to having a high molecular weight by an inter-bimolecular reaction or crosslinking. The number mentioned here represents the average number of the epoxy groups existing in the whole of the acrylic polymer (B)

The content number of the epoxy groups in the acrylic polymer (B) is changed depending on the reactivity of the epoxy groups, a site in which the epoxy groups are contained and its mode, and the number of the acid anhydride group and/or the carboxyl group in the acrylic block copolymer (A), sites in which the acid anhydride group and/or the carboxyl group is contained and its mode. Accordingly, it may be set according to requirement, but is 1.1 or more in the acrylic polymer (B), more preferably 1.5 or more, and particularly preferably 2.0 or more. When it is less than 1.1, an effect as a high molecular weight-converting reaction agent for the bimolecular reaction of the block copolymer and a crosslinking agent is low and the improvement of heat resistance of the acrylic block copolymer (A) tends to be insufficient.

The acrylic polymer (B) is preferably a polymer obtained by polymerizing 1 or at least 2 kinds of acrylic monomers or polymerizing a mixture of 1 or at least 2 kinds of acrylic monomers with other monomers other than the acrylic monomers.

The acrylic monomer includes an acryloyl group-containing monomer and a methacryloyl group-containing monomer, and the specific examples are methyl (meth)acrylate, ethyl (meth)acrylate, propyl (meth)acrylate, butyl (meth)acrylate, 2-ethylhexyl (meth)acrylate, cyclohexyl (meth)acrylate, (meth)acrylic acid, hydroxyethyl (meth)acrylate, hydroxypropyl (meth)acrylate, glycidyl (meth)acrylate, 2-methoxyethyl (meth)acrylate, 2-ethoxyethyl (meth)acrylate, 2-butoxyethyl (meth)acrylate, and 2-phenoxyethyl (meth)acrylate. Further, in the present specification, (meth)acrylate means acryl or methacryl. As the above-mentioned other monomers, a monomer copolymerizable with the acryl base monomer, for example, vinyl acetate, and styrene can be used.

The acrylic polymer (B) includes an acryloyl group-containing monomer unit. The proportion of the monomer unit containing an acryloyl group to the total monomer unit in the acrylic polymer (B) is preferably at least 70% by weight. When the proportion is less than 70% by weight, weather resistance of the polymer is comparatively low and compatibility with the acrylic block copolymer (A) tends to be lowered. Further, discoloration is easily caused in the molded article.

The acrylic polymer (B) is preferably obtained by polymerizing 50 to 100% by weight of at least one monomer selected from the group consisting of n-butyl acrylate, ethyl acrylate and 2-methoxyethyl acrylate and 50 to 0% by weight of other acrylate ester and/or other vinyl monomer copolymerizable with these monomers. As the vinyl monomer, styrene is preferable.

Further, the weight average molecular weight of the acrylic polymer (B) is not particularly limited, but preferably a polymer having a low molecular weight of 30,000 or less, further preferably a polymer of 500 to 30,000, and particularly preferably a polymer of 500 to 10,000. When the weight average molecular weight is less than 500, a molded article tends to be sticky and on the other hand, when the weight average molecular weight exceeds 30,000, the polymer tends to hardly plasticize a molded article.

The viscosity of the acrylic polymer (B) is preferably 35,000 mPa·s or more at measuring with a cone plate type rotational viscometer (E type viscometer) at 25° C. More preferable viscosity is 10,000 mPa·s or more. Particularly preferable viscosity is 5,000 mPa·s or more. When the viscosity is higher than 35,000 mPa·s, the plasticizer hardly plasticizes a molded article. There is no particular lower limit of preferable viscosity, but the usual viscosity of the acrylic polymer is 10 mPa·s or more.

The glass transition temperature Tg of the acrylic polymer (B) measured by a differential scanning caloriemeter (DSC) is preferably 100° C. or less, more preferably 25° C. or less, further preferably 0° C. or less, and particularly preferably −30° C. or less. When the glass transition temperature Tg exceeds 100° C., tendency for improving moldability as a plasticizer is lowered, and flexibility of the obtained molded article tends to be lowered.

The acrylic polymer (B) can be prepared by polymerizing by known processes. The polymerization process is not particularly limited, and can be carried out by, for example, suspension polymerization, emulsion polymerization, bulk polymerization, living anion polymerization, and controlled polymerization such as polymerization using a chain transfer agent and living radical polymerization, but a process in which a comparatively low molecular weight polymer with satisfactory weather resistance and heat resistance can be obtained is preferable, and a process by using high temperature continuous polymerization described in the flowing is more preferable from the viewpoint of the cost thereof.

The acrylic polymer (B) is preferably obtained by polymerization reaction at a temperature of 180 to 350° C. Since a comparatively low molecular weight polymer is obtained at the polymerization temperature without a polymerization initiator and a chain transfer agent, the obtained acrylic polymer is an excellent plasticizer and satisfactory in weather resistance. The specific examples are processes by high temperature continuous polymerization disclosed in JP-A-57-502171, JP-A-59-6207, JP-A-60-215007 and WO 01/083619. Namely, it is a process in which a mixture of the above-mentioned monomers is continuously fed at a fixed speed to a reactor which is set at a fixed temperature and pressure and the reaction solution in conformity with the feed amount is extracted.

As the acrylic polymer (B), specifically, ARUFON XG4000, ARUFON XG4010, ARUFON XD945, ARUFON XD950, ARUFON UG4030, and ARUFON UG4070 of TOAGOSEI Co., Ltd. can be favorably exemplified.

These are acrylic polymers such as all acryl and acrylate/styrene and 1.1 or more of the epoxy groups are contained in a molecule.

The acrylic polymer (B) is preferably used in a range of 0.1 to 100 parts by weight based on 100 parts by weight of the acrylic block copolymer (A), more preferably a range of 1 to 50 parts by weight, and particularly preferably a range of 1.5 to 20 parts by weight. When the compounding amount is less than 0.1 parts by weight, moldability and heat resistance of the obtained molded article may occasionally insufficient and when it exceeds 100 parts by weight, the mechanical property of the obtained composition tends to be lowered.

<Thermoplastic Elastomer Composition>

The thermoplastic elastomer composition of the present invention is low in melt viscosity at molding and excellent in moldability, and on the other hand, the acid anhydride group and/or carboxyl group in the acrylic block copolymer (A) is reacted with an epoxy group in the acrylic polymer (B) at molding, and the acrylic block copolymer (A) is preferably converted to having a high molecular weight or crosslinked. It is more preferable to crosslink it at molding from the viewpoint of the improvement of heat resistance.

In the thermoplastic elastomer composition of the present invention, various additives and a catalyst may be added if necessary in order to accelerate a reaction at molding. For example, curing agents such as acid anhydride base such as acid dianhydride, amine base and imidazole base which are generally used for an epoxy resin can be also used.

In the thermoplastic elastomer composition of the present invention, a filler is compounded if necessary, and it can be preferably used. The filler is not particularly limited, and examples are reinforcing fillers such as wood flour, pulp, cotton chip, asbestos, glass fiber, carbon fiber, mica, walnut shell flour, rice hull flour, graphite, diatom earth, white clay, silica (fumed silica, precipitating silica, crystal silica, fused silica, dolomite, silicic anhydride, hydrated silicic acid) and carbon black; fillers such as heavy calcium carbonate, colloidal calcium carbonate, magnesium carbonate, diatom earth, calcined clay, clay, talc, titanium oxide, bentonite, organic bentonite, ferric oxide, colcothar, aluminum fine powder, flint powder, zinc oxide, active zinc oxide, zinc powder, zinc carbonate and sand bur balloon; fibrous fillers such as asbestos, glass fiber and glass filament, carbon fiber, Kevlar fiber and polyethylene fiber.

Among those fillers, inorganic fillers are more preferable from the viewpoints of the improvement of mechanical property, reinforcing effect, cost, and titanium oxide, carbon black, calcium carbonate, silica and talc are further preferable.

Further, in case of silica, silica on which the surface is preliminarily hydrophobically treated with organosilicone compounds such as organosilanes, organosilazane and diorganopolysiloxane may be used. Further, as calcium carbonate, there may be also used calcium carbonate in which surface treatment is carried out using surface treating agents such as organic substances such as fatty acids, fatty acid soap and fatty acid esters; various surfactants, and various coupling agents such as a silane coupling agent and a titanate coupling agent.

An amount to be added in the case of using the filler is preferably in a range of 5 to 200 parts by weight based on 100 parts by weight of the acrylic block copolymer (A), and more preferably in a range of 10 to 100 parts by weight. When the amount is less than 5 parts by weight, the reinforcing effect of the obtained molded article is occasionally not sufficient, and when it exceeds 200 parts by weight, moldability of the composition tends to be lowered. At least one filler can be used.

The thermoplastic elastomer composition of the present invention can compound various lubricants for moldability, mold releasing property and for making the surface of a molded article low frictional, and it can be preferably used.

The lubricant includes fatty acids such as stearic acid and palmitic acid; metal salts of fatty acids such as calcium stearate, zinc stearate, magnesium stearate, potassium palmitate and sodium palmitate; waxes such as polyethylene wax, polypropylene wax and montanic acid wax; low molecular weight polyolefins such as low molecular weight polyethylene and low molecular weight polypropylene; polyorganosioxanes such as dimethylpolysiloxane; cucutadecylamine, alkyl phosphate, fatty acid esters, amide lubricants such as ethylenebisstearylamide, fluorine resin powder such as ethylene tetrafluoride resin, molybdenum disulfide powder, silicone resin powder, silicone rubber powder, and silica. At least one kind of these can be used. Among those, stearic acid, zinc stearate, calcium stearate, fatty acid esters, ethylenebisstearylamide which are excellent in cost and moldability are preferable.

An amount to be added in the case of using the lubricant is preferably in a range of 0.1 to 20 parts by weight based on 100 parts by weight of the acrylic block copolymer (A), and more preferably in a range of 0.2 to 20 parts by weight. When the compounding amount is less than 0.1 part by weight, the improving effect of moldability and making the obtained molded article have low friction are occasionally not sufficient, and when it exceeds 20 parts by weight, the mechanical property and chemical resistance of the obtained molded article tend to be deteriorated. At least one lubricant can be used.

In the thermoplastic elastomer composition of the present invention, various additives other than those described above may be added if necessary, for the purpose of the adjustment of various physical properties of the thermoplastic elastomer composition and the obtained molded article. As the additives, a stabilizer, a plasticizer, a flexibility imparting agent, a flame retardant, a pigment, an antistatic agent, an antibacterial and antifungus agent may be added.

As the above-mentioned stabilizer, an antioxidant, a photo stabilizer, and an ultraviolet absorbent are raised. Examples of antioxidant are amine antioxidants such as phenyl-$\alpha$-naphthylamine (PAN), octyldiphenylamine, N,N'-diphenyl-p-phenylenediamine (DPPD), N,N'-di-$\beta$-naphthyl-p-phenylenediamine (DNPD), N-(1,3-dimethylbutyl)-N'-phenyl-p-phenylenediamine, N-phenyl-N'-isopropyl-p-phenylenediamine (IPPN), N,N'-diallyl-p-phenylenediamine, phenothiazine derivative, diallyl-p-phenylenediamine mixture, alkylated phenylenediamine, 4,4'-bis($\alpha,\alpha$-dimethylbenzyl)diphenylamine, N-phenyl-N'-(3-methacryloyloxy-2-hydropropyl)-p-phenylenediamine, diallylphenylenediamine mixture, diallyl-p-phenylenediamine mixture, N-(1-methylheptyl)-N'-phenyl-p-phenylenediamine and diphenylamine derivative; imidazole antioxidants such as 2-mercaptobenzoimidazole (MBI); phenol antioxidants such as 2,6-di-t-butyl-4-methylphenol and pentaerythrityltetrakis[3-(5-di-t-butyl-4-hydroxyphenol)-propionate]; phosphate antioxidants such as nickel diethyl-dithio-carbamate; the secondary antioxidants such as triphenylphosphite; 2-t-butyl-6-(3-t-butyl-2-hydroxy-5-methylbenzyl)-4-methylphenyl acrylate, and 2-[1-(2-hydroxy-3,5-di-t-pentylphenyl)ethyl]-4,6-di-t-pentylphenyl acrylate. Further, examples of the photo stabilizer and ultraviolet absorbent are 4-t-butylphenyl salicylate, 2,4-dihydroxybenzophenone, 2,2'-dihydroxy-4-methoxybenzophenone, ethyl-2-cyano-3,3'-diphenyl acrylate, 2-ethylhexyl-2-cyano-3,3'-diphenyl acrylate, 2-hydroxy-5-chlorobenzophenone, 2-hydroxy-4-methoxybenzophenone-2-hydroxy-4-octoxybenzophenone, monoglycol salicylate, oxalic amide, and 2,2',4,4'-tetrahydroxybenzophenone.

Examples of industrial products are Irganox 1010 (available from Chiba Specialty Chemicals Co., Ltd.), SANOL LS770 (available from SANKYO Lifetech Co., Ltd.), ADEKA STAB LA-57 (available from ADEKA Corporation), ADEKA STAB LA-68 (available from ADEKA Corporation), Chimassorb 944 (available from Chiba Specialty Chemicals Co., Ltd.), SANOL LS765 (available from SANKYO Lifetech Co., Ltd.), ADEKA STAB LA-62 (available from ADEKA Corporation), TINUVIN 144 (available from Chiba Specialty Chemicals Co., Ltd.), ADEKA STAB LA-63 (available from ADEKA Corporation), TINUVIN 622 (available from Chiba Specialty Chemicals Co., Ltd.), ADEKASTAB LA-32 (available from ADEKA Corporation), ADEKA STAB LA-36 (available from ADEKA Corporation), TINUVIN 571 (available from Chiba Specialty Chemicals Co., Ltd.), TINUVIN 234 (available from Chiba Specialty Chemicals Co., Ltd.), ADEKA STAB LA-31 (available from ADEKA Corporation), TINUVIN 1130 (available from Chiba Specialty Chemicals Co., Ltd.), ADEKA STAB AO-20 (available from ADEKA Corporation), ADEKA STAB AO-50 (available from ADEKA Corporation), ADEKA STAB 2112 (available from ADEKA Corporation), ADEKA STAB PEP-36 (available from ADEKA Corporation), SUMILIZER GM (available from Sumitomo Chemical Co., Ltd.), SUMILIZER GS (available from Sumitomo Chemical Co., Ltd.), and SUMILIZER TP-D (available from Sumitomo Chemical Co., Ltd.). These may be used alone and at least two kinds thereof may be used in combination. Among those, SANOL LS770, Irganox 1010, SUMILIZER GS and TINUVIN 234 are preferable from the viewpoints of the prevention effect of deterioration by heat and light of the acrylic block and the cost thereof.

Example of the above-mentioned plasticizer are phthalic acid derivatives such as dimethyl phthalate, diethyl phthalate, di-n-butyl phthalate, di-(2-ethylhexyl) phthalate, diheptyl phthalate, diisodecyl phthalate, di-n-octyl phthalate, diisononyl phthalate, ditridecyl phthalate, octyldecyl phthalate, butylbenzyl phthalate and dicyclohexyl phthalate; isophthalic acid derivatives such as dimethyl isophthalate; tetrahydrophthalic acid derivatives such as di-(2-ethylhexyl) tetrahydrophthalate; adipic acid derivatives such as dimethyl adipate, dibutyl adipate, di-n-hexyl adipate, di-(2-ethylhexyl) adipate, isononyl adipate, diisodecyl adipate and dibutyldiglycol adipate; azelaic acid derivatives such as di-(2-ethylhexyl) azelate; sebacic acid derivatives such as dibutyl sebacate; dodecan-2-ic acid derivatives; maleic acid derivatives such as dibutyl maleate and di-(2-ethylhexyl) maleate; fumaric acid derivatives such as dibutyl fumarate; trimellitic acid derivatives such as tris-(2-ethylhexyl) trimellitate; pyromellitic acid derivatives; citric acid derivatives such as acetyltributyl citrate; itaconic acid derivatives; oleic acid derivatives; ricinoleic acid derivatives; stearic acid derivatives; other fatty acid derivatives; sulfonic acid derivatives; phosphoric acid derivatives; glutaric acid derivatives; polyester plasticizers which are polymers of dibasic acids such as adipic acid, azelaic acid and phthalic acid with glycol and monovalent alcohol; glycol derivatives; glycerin derivatives; paraffin derivatives such as chlorinated paraffin; epoxy derivative polyester polymerization type plasticizers; polyether polymerization type plasticizers; carbonate derivatives such as ethylene carbonate and propylene carbonate. The plasticizer in the present invention is not limited thereto, various plasticizers can be used and those which are widely commercially available as a plasticizer for rubber can be also used. It can be expected that these compounds can lower the viscosity of the acrylic block copolymer (A). Examples of commercially available plasticizers are THIOCOL TP (available from Morton Co.), ADEKACIZER O-130P, C-79, UL-100, P-200, and RS-735 (available from ADEKA Corporation). Examples of a high molecular weight plasticizer other than those are acrylic polymer, polypropylene glycol polymer, polytetrahydrofuran polymer, and polyisobutylene polymer. It is not particularly limited, but among those, adipic acid derivatives, phthalic acid derivatives, glutaric acid derivatives, trimellitic acid derivatives, pyromellitic acid derivatives, polyether plasticizers, glycerin derivatives, epoxy derivative polyester polymerization type plasticizers, polyether polymerization type plasticizers are preferable since they have low volatility and weight loss thereof by heating is small.

The above-mentioned flexibility imparting agent is not particularly limited, and examples are a softening agent such as process oil; oil such as animal oil and plant oil; petroleum fractions such as kerosene, light oil, heavy oil and naphtha. As the softening agent, process oil is mentioned, and more specific examples are paraffin oil; naphthene process oil; and petroleum process oil such as aromatic process oil. As the plant oil, examples are ricinus oil, cotton seed oil, linseed oil, rape seed oil, soy bean oil, palm oil, coconut oil, peanut oil, pine oil, and tall oil, and at least one of these flexibility imparting agents can be used.

As the above-mentioned flame retardant, the following compounds can be mentioned but they are not particularly limited, and examples are triphenyl phosphate, tricresyl phosphate, decabromobiphenyl, decabromobiphenyl ether, and antimony trioxide. These can be used alone, or a plurality of these may be used in combination.

As the above-mentioned pigment, the following compounds can be mentioned but they are not particularly limited, and examples are carbon black, titanium oxide, zinc sulfide, and zinc oxide. These can be used alone, or a plurality of these may be used in combination.

<Preparation Process of Thermoplastic Elastomer Composition>

The preparation process of thermoplastic elastomer composition is not particularly limited, but for example, as a batch type kneading device, a mixing roll, a Banbury mixer, a pressuring kneader and a high shearing mixer can be used, and as a continuous kneading equipment, a uniaxial extruder, a biaxial extruder, and a KCK extruder may be used. Further, known processes such as a process of mechanically mixing a composition to be formed in pellets can be used.

A temperature at kneading for preparing the thermoplastic elastomer composition is preferably a temperature at which the acrylic block copolymer (A) is reacted with acrylic polymer (B) and moldability is not lowered. A temperature at which the acrylic block copolymer (A) is reacted with acrylic polymer (B) and moldability is deteriorated is determined by kinds of the acid anhydride group, carboxyl group, epoxy group, introduction amount, the composition of the acrylic block copolymer (A) and acrylic polymer (B), and the compatibility of the acrylic block copolymer (A) with acrylic polymer (B). Accordingly, the reaction is carried out at a desired temperature by changing these conditions. Herein, the reaction temperature is preferably 200° C. or less for enabling molding of the obtained composition, more preferably 180° C. or less, and further preferably 150° C. or less.

It is preferable to carry out processing at a temperature at which high molecular weight conversion or crosslinking does not occur and processing can be carried out. But the temperature may be within a range in which processing can be carried out, though high molecular weight conversion occurs in part or partial crosslinking occurs.

In the case of the powder slash molding, it is preferable to obtain the thermoplastic elastomer composition as powder. As the process of obtaining powder, the powder can be obtained by finely pulverizing the thermoplastic elastomer composition in a block state or a pellet state which is processed by the above-mentioned process by using an impact pulverizer such as a turbo mill, a pin mill, a hammer mill and a centrifugation mill. At this time, pulverization is usually carried out at normal temperature, but mechanical pulverization can be carried out by using a cooling medium and a cooling facility.

<Molding Process of Thermoplastic Elastomer Composition>

The composition obtained in the above-described preparation process of the thermoplastic elastomer can be molded by various processes, and it can be preferably applied to powder slash molding, injection molding, injection blow molding, blow molding, extrusion blow molding, extrusion molding, calendar molding, vacuum molding, and press molding. Among them, the powder slash molding is more preferably used. Herein, the powder slash molding is a process of flowing the composition powder into a molding mold heated at a high temperature to be melt-molded and taking out a molded article solidified by cooling after taking a definite period of time. It is required to fluidize the powder to carry out melt-molding even under no pressurization in the powder slash molding, but on the other hand, the molded article after molding is exposed in environments where the molded article is used at 100° C. or more. Therefore it is difficult to make a balance between moldability and heat resistance. However, since the acrylic block copolymer (A) and the acrylic polymer (B) in the thermoplastic elastomer composition of the present invention are in an unreacted state before molding, and (B) effectively works as a plasticizer, thereby the composition is excellent in melting property in a mold. On the other hand, the acrylic block copolymer (A) is reacted with the acrylic polymer (B) within a definite period of time until it is solidified by cooling, the acrylic block copolymer (A) is converted to having a high molecular weight or crosslinked, and heat resistance after the molding is improved. Consequently, the thermoplastic elastomer composition can be recognized as a preferable material for the powder slash molding.

When heat resistance is imparted by the high molecular weight conversion of the acrylic block copolymer (A) at molding in the powder slash molding, the number average molecular weight of the acrylic block copolymer (A) after molding is preferably 100,000 or more, more preferably 150,000 or more and further preferably 200,000 or more. When the number average molecular weight is lower than 100,000, the improvement effect of the heat resistance tends to be lowered.

Further, when the heat resistance is imparted by crosslinking at molding, the insoluble content ratio (% by weight) of the molded article after molding is preferably 50% or more by weight, more preferably 70% or more by weight, and further more preferably 80% or more by weight. When the insoluble content ratio is lower than 50% by weight, the improvement effect of the moldability and heat resistance tends to be lowered. On the other hand, the insoluble content ratio before molding is preferably 30% or less by weight, more preferably 10% or less by weight, and further preferably 5% or less by weight. When it is 30% by weight or more, moldability tends to be deteriorated.

In the above description, the insoluble content ratio (% by weight) represents the weight of a residual solid for 1 g of the thermoplastic elastomer composition. The residual solid is obtained by packing 1 g of the thermoplastic elastomer composition in a 350 mesh metal net, immersing it in toluene at 80° C. or acetone at 60° C. for 24 hours (toluene or acetone is selected by the solubility of the thermoplastic elastomer composition), fractionating a toluene or acetone soluble part, drying the residual solid at 80° C. under vacuum and measuring the weight g of the residual solid after drying.

EXAMPLES

The present invention is further explained in detail based on Examples, but the present invention is not limited only to these Examples. Further, BA, EA, MEA, MMA, TBMA, and TBA respectively represent n-butyl acrylate, ethyl acrylate, 2-methoxyethyl acrylate, methyl methacrylate, t-butyl methacrylate, and t-butyl acrylate.

<Measurement Method of Molecular Weight>

Molecular weight shown in the present Example was calculated in terms of polystyrene which was measured by a GPC analysis device shown below using chloroform as mobile phase. A GPC system made by Waters Co. was used as a system and Shodex k-804 (polystyrene gel) available from Showa Denko K.K. was used as a column.

<Measurement Method of Conversion of Polymerization Reaction>

The conversion of a polymerization reaction shown in the present Examples was measured by an analysis equipment and conditions shown below.

Device: Gas chromatography GC-14B made by Shimadzu Corporation.

Separation column: Capillary column; Supelcowax-10, 0.35 mm$\phi$×30 m, made by J & W SCIENTIFIC INC.

Separation condition: Initial temperature: 60° C. and retention for 3.5 minutes.
  Temperature increasing speed: 40° C./min
  Final temperature: 140° C. and retention for 1.5 minutes
  Injection temperature: 250° C.
  Detector temperature: 250° C.

Sample adjustment: A sample was diluted to about 3-fold by ethyl acetate and butyl acetate was used as an internal standard substance.

<Measurement of Insoluble Content Ratio (% by Weight)>

1 g of the thermoplastic elastomer composition was packed in a 350 mesh metal net, and it was immersed in toluene at 80° C. or acetone at 60° C. for 24 hours (toluene or acetone is selected by the solubility of the acrylic block copolymer). Then, a toluene or acetone soluble part was fractionated, the residual solid was dried at 80° C. under vacuum and the weight g of the residual solid after drying was measured. The insoluble content ratio is represented by a weight of the residual solid content for 1 g of the thermoplastic elastomer composition.

<Ethanol Resistance Test>

Ethanol resistance shown in Examples and Comparative Examples was measured according to conditions shown in the following.

The sheets with crepe pattern prepared in Examples and Comparative Examples were placed on a flat surface, one drop of ethanol (available from Wako Pure Chemical Industry Ltd.) was added dropwise with a pipette thereon, and they were left alone at a room temperature for 24 hours. Then, their surfaces were visually observed. The sheets were evaluated by the criteria such that those having no trace were ○, those in which trace was observed but had no whitening were Δ, and those in which whitening was observed were X.

<Oil Resistance Test>

Paraffin resistance property shown in Examples and Comparative Examples were measured by conditions shown in the following.

The sheets with crepe pattern prepared in Examples and Comparative Examples were placed on a flat surface, one drop of liquid paraffin (available from Nakarai Tesk Co.) was added dropwise with a pipette thereon, and they were left alone at a room temperature for 24 hours. Then, the liquid paraffin was wiped off with KIMWIPE (made by Cresia Inc.) and their surfaces were visually observed. The sheets were evaluated by the criteria such that those having no trace were ○, those in which trace was observed but had no whitening were Δ, and those in which whitening was observed were X.

<Heat Resistance Test>

Heat resistance shown in Examples and Comparative Examples were measured by conditions shown in the following.

The sheets with crepe pattern prepared in Examples and Comparative Examples were left alone at 120° C. for 24 hours. Then, their surfaces were visually observed. The sheets were evaluated by the criteria such that those in which the change of the crepe pattern was not observed were ○, those in which the change of the crepe pattern was not clear but surface luster was increased in comparison with the initial stage were Δ, and those in which the change of the crepe pattern was observed were X.

<Urethane Adhesivity Test>

Superficial skin materials were prepared by press-molding the compositions according to Examples. A cartridge type polyurethane (available from Air Tight Co.) in which 4,4'-diphenylmethanediisocyanate was the main component was coated on a metal plate and the superficial skin material was immediately mounted on the foamed body to be adhered. After taking for at least 12 hours (state in which the foamed article was completely cured), the superficial skin material was peeled from the foamed urethane with a hand and the state of destruction was observed. Those in which destruction occurred in a urethane material were referred to as ○, those in which destruction occurred at the portion of interface between a sheet and urethane were referred to as Δ, and those in which destruction occurred at interface between the sheet and urethane were referred to as X.

<Powder Slash Property Test>

A block of the composition was prepared according to Examples and Comparative Examples. The block of the composition was charged in a small size pulverizer (made by Kyoritsu-Riko Co.) cooled with dry ice and pulverized while adding dry ice. The obtained powder was evaluated under condition in the following. The obtained powder was brought in contact for 30 seconds with a skin crepe metal plate heated at 260° C., unmelted powder was removed after heat-melting and it was cooled to a room temperature to obtain a molded sheet.

Evaluation Index:

The obtained molded sheet was observed visually. The sheet was evaluated by the criteria such that those in which crepe transcription property was good and pinhole/foams were not found were referred to as ○, those in which either of one of items was poor were referred to as Δ, and those in which the site of poor crepe formation was found and pinhole/foams were found were referred to as X.

Preparation Example 1

Synthesis of (MMA-co-BA-co-TBMA)-b-BA-b-(MMA-co-BA-co-TBMA) Type Acrylic Block Copolymer (Hereinafter, Described as "the Precursor 1")

The following operations were carried out in order to obtain the precursor 1. After a 15 L pressure resistant reactor was purged with nitrogen, 13.6 g (95 mmol) of copper bromide was weighed and 146 g of acetonitrile (treated with nitrogen bubbling) was added. After stirring by heating at 70° C. for 30 minutes, 19.0 g (53 mmol) of diethyl 2,5-dibromoadipate as an initiator and 1664 g (13.0 mol) of BA were added. The mixture was stirred by heating at 85° C., and 1.65 g (9.5 mmol) of pentamethyldiethylenetriamine as a ligand was added to initiate polymerization.

About 0.2 mL of the polymerization solution as for sampling was extracted from the polymerization solution periodically from the start of the polymerization, and the conversion of BA was determined by the gas chromatogram analysis of the sampling solution. A polymerization speed was controlled by adding pentamethyldiethylenetriamine as needed. When the conversion of BA reached 94.6%, 82.8 g (0.58 mol) of TBMA, 927 g (9.3 mol) of MMA, 202 g (1.6 mol) of BA, 9.4 g (95 mmol) of copper chloride, 1.98 g (9.5 mmol) of pentamethyldiethylenetriamine and 2269 g of toluene (treated with nitrogen bubbling) were added thereto. The conversion of TBMA, MMA and BA were determined in the same manner. When the conversion of TBMA was 93.1%, the conversion of MMA was 89.2% and the conversion of BA was 66.8% based on the concentration of BA just after the addition of MMA/TBMA/BA, 2400 g of toluene was added, and the reactor was cooled with a water bath to terminate the reaction.

The polymerization solution was diluted with 1900 g of toluene, 32.5 g of p-toluene sulfonic acid monohydrate was added to be stirred for 3 hours at a room temperature, and a precipitated solid was removed by filtration. 40.8 g of an absorbent KYOWARD 500SH (available from KYOWA Chemical Industry Co., Ltd.) was added to the obtained polymer solution, and the mixture was further stirred at a room temperature for one hour. The absorbent was filtered by a Kiriyama funnel to obtain a colorless transparent polymer solution. The solution was dried and the solvent and the residual monomer were removed to obtain the precursor 1 which was the objective acrylic block copolymer.

When the GPC analysis of the precursor 1 of the acrylic block copolymer was carried out, the number average molecular weight Mn was 72,200 and the molecular weight distribution Mw/Mn was 1.42.

<Reaction Forming Acid Anhydride of Precursor 1>

45 g of the precursor 1 obtained in the above description and 0.09 g of Irganox 1010 (available from Chiba Specialty Chemicals Co., Ltd.) were melt-kneaded at 100 rpm for 20 minutes using a LABO Plasto Mill 50C150 (blade shape: roller type R60, made by TOYO SEIKI KOGYO Co., Ltd.) set at 240° C. to obtain an objective acrylic block copolymer containing an acid anhydride group and a carboxyl group (hereinafter, the obtained polymer is described as "the polymer 1").

The conversion to the acid anhydride group and the carboxyl group at a t-butyl ester site could be confirmed by IR (infrared absorption spectrum) and $^{13}C(^1H)$-NMR (nuclear magnetic resonance spectrum). Namely, in IR, it could be confirmed because absorption spectrum derived from an acid anhydride group was observed nearby 1800 cm$^{-1}$ after the conversion. In $^{13}$C($^1$H)-NMR, it could be confirmed because a signal at 82 ppm which was derived from quaternary carbon of t-butyl group and a signal at 28 ppm which was derived from methyl carbon of t-butyl group were extinguished after the conversion and a signal at 172 to 173 ppm (m) which was derived from the carbonyl carbon of an acid anhydride group and a signal at 176 to 179 ppm (m) which was derived from the carbonyl carbon of a carboxyl group newly appeared.

Preparation Example 2

Synthesis of (MMA-co-BA)-b-(BA-co-TBA)-b-(MMA-co-BA) Type Acrylic Block Copolymer (Hereinafter, Described as "the Precursor 2")

The following operations were carried out in order to obtain the precursor 2. After a 15 L pressure resistant reactor was purged with nitrogen, 7.89 g (55 mmol) of copper bromide, 830 g (6.5 mol) of BA and 117 g (0.92 mol) of TBA were charged to start stirring. Then, a solution in which 11.0 g (31 mmol) of diethyl 2,5-dibromoadipate as an initiator was dissolved in 83.3 g of acetonitrile (treated with nitrogen bubbling) was charged and the inner solution was stirred for 30 minutes while raising a temperature to 75° C. When the inner temperature reached 75° C., 0.95 g (5 mmol) of pentamethyldiethylenetriamine as a ligand was added thereto to initiate the polymerization of an acrylic block copolymer.

About 0.2 mL of the polymerization solution as for sampling was extracted from the polymerization solution by every fixed time from the start of the polymerization, and the conversions of BA and TBA were determined by the gas chromatogram analysis of the sampling solution. A polymerization speed was controlled by adding pentamethyldiethylenetriamine at the polymerization as needed. Pentamethyldiethylenetriamine was added 3 times in total (2.85 g in total) during the polymerization of the acrylic polymer block.

When the conversion of BA reached 96.9% and the conversion of TBA reached 96.9%, 563 g (5.6 mol) of MMA, 127 g (1.0 mol) of BA, 5.44 g (55 mmol) of copper chloride, 0.95 g (5 mmol) of pentamethyldiethylenetriamine and 1287 g of toluene (treated with nitrogen bubbling) were added thereto to start the polymerization of the methacrylic polymer block.

The conversions of MMA and BA were determined in the same manner as at the polymerization of the acrylic polymer block. Sampling was carried out at charging MMA and BA, and the conversions of MMA and BA were determined using this as a basis. After charging MMA and BA, the inner temperature was set at 85° C. A polymerization speed was controlled by adding pentamethyldiethylenetriamine at polymerization as needed. Pentamethyldiethylenetriamine was added 4 times in total (3.8 g in total) during the polymerization of the methacrylic polymer block. When the conversion of MMA was 89.7% and the conversion of BA was 64.8%, 2400 g of toluene was added and the reactor was cooled with a water bath to terminate the reaction.

Toluene was added to the obtained polymerization solution and it was diluted so that the concentration of the polymer was 25% by weight. 20.0 g of p-toluene sulfonic acid monohydrate was added to the solution to be stirred for 3 hours at a room temperature, and a precipitated solid was removed by filtration.

33.0 g of an absorbent KYOWARD (trade mark) 500SH (available from KYOWA Chemical Industry Co., Ltd.) was added to the obtained polymer solution, and the mixture was further stirred at a room temperature for one hour. The absorbent was filtered by a Kiriyama funnel to obtain a colorless transparent polymer solution. The solution was dried and the solvent and the residual monomer were removed to obtain the precursor 2 which was the objective acrylic block copolymer.

When the GPC analysis of the obtained precursor 2 of the acrylic block copolymer was carried out, the number average molecular weight Mn was 70,336, and the molecular weight distribution Mw/Mn was 1.44.

<Reaction Forming Acid Anhydride of Precursor 2>

700 g of the precursor 2 obtained in the above description, 4.2 g of Irganox 1010 (available from Chiba Specialty Chemicals Co., Ltd.) and 0.7 g of hydrotalcite DHT-4A-2 (available from KYOWA Chemical Industry Co., Ltd.) as an acid trapping agent were compounded and melt-kneaded at about 50 rpm for 50 minutes using a DS1-5MHB-E kneader (made by MORIYAMA Co., Ltd.) set at 260° C. to obtain an objective acrylic block copolymer containing an acid anhydride group and a carboxyl group (hereinafter, the obtained polymer is described as "the polymer 2").

The measurement of conversion efficiency to the acid anhydride group and the carboxyl group at t-butyl ester site was carried out by quantifying the amount of isobutylene generated from the t-butyl group by a thermal decomposition reaction at 280° C. As a result of the measurement, the conversion efficiency of the obtained resin was at least 95%.

Preparation Example 3

Synthesis of (MMA-co-BA)-b-(BA-co-TBA)-b-(MMA-co-BA) Type Acrylic Block Copolymer (hereinafter, Described as "the Precursor 3")

The following operations were carried out in order to obtain the precursor 3.

A 500 L reactor purged with nitrogen was charged with 68.57 kg of n-butyl acrylate, 6.40 kg of t-butyl acrylate and 0.625 kg of cuprous bromide to start stirring. Then, a solution in which 0.872 kg of diethyl 2,5-dibromoadipate was dissolved in 6.59 kg of acetonitrile was charged, warm water was flowed into a jacket, and the solution was stirred for 30 minutes while raising a temperature of the inner solution to 75° C. When the inner temperature reached 75° C., 75.5 g of pentamethyldiethylenetriamine was added thereto to initiate the polymerization of an acrylic polymer block. Pentamethyldiethylenetriamine was added 3 times in total (226.5 g in total) during the polymerization of the acrylic polymer block. A polymerization speed was controlled by adding pentamethyldiethylenetriamine at the polymerization as needed.

When the conversion reached 97%, 101.7 kg of toluene, 0.431 kg of cuprous chloride, 44.40 kg of methyl methacrylate, 10.07 kg of butyl acrylate and 75.5 g of pentamethyldiethylenetriamine were added thereto to start the polymerization of the methacrylic polymer block. When the conversion of MMA reached 91%, 220 kg of toluene was added to dilute the reaction solution, and the reactor was cooled to terminate the reaction. When the GPC analysis of the obtained block copolymer was carried out, the number average molecular weight Mn was 74,900 and the molecular weight distribution Mw/Mn was 1.39.

30 kg of toluene was added to the obtained block copolymer solution, and the concentration of the polymer was adjusted to 25% by weight. 1.74 kg of p-toluene sulfonic acid was added to the solution, the inside of the reactor was purged with nitrogen, and the solution was stirred for 3 hours at 30° C. The reaction solution was sampled, and after confirming that the solution was colorless and transparent, 2.48 kg of RADIOLITE #3000 available from Showa Chemical Industry Co., Ltd. was added thereto. Then, the reactor was pressurized to 0.1 to 0.4 MPaG with nitrogen, and a solid was separated using a pressure filtering machine (filtration area of 0.45 m$^2$) equipped with polyester felt as a filtration material.

1.86 kg of KYOWARD 500SH was added to about 450 kg of the block copolymer solution after filtration, the reactor was purged with nitrogen and the solution was stirred at 30° C. for one hour. The reaction solution was sampled, and after confirming that the solution was neutral, the reaction was terminated. Then, the reactor was pressurized to 0.1 to 0.4 MPaG with nitrogen, and a solid was separated using a pressure filtering machine (filtration area of 0.45 m$^2$) equipped with polyester felt as a filtration material to obtain the polymer solution. 730 g of Irganox 1010 (available from Chiba Specialty Chemicals Co., Ltd.) was added to the obtained polymer solution and dissolved.

Successively, the solvent component was evaporated from the polymer solution. SCP 100 (heat transfer area: 1 m$^2$) made by Kurimoto Ltd. was used as an evaporator. The evaporation of the polymer solution was carried out by setting a heat transfer oil at the inlet of the evaporator at 180° C., the vacuum degree of the evaporator as 90 Torr, the rotational number of a screw as 60 rpm and the feed speed of the polymer solution as 32 kg/h. The polymer was made as strand with a dice of 4 mmϕ through a discharger, it was cooled with a water vessel filled with 3% suspension solution of ALFLOW H50ES (main component: ethylenebisstearic acid amide available from NOF Corporation), and columnar pellets were obtained by a pelletizer. Thus, pellets of the precursor 3 of the objective acrylic block copolymer were obtained.

<Reaction Forming Acid Anhydride of Precursor 3>

1 part by weight of hydrotalcite DHT-4A-2 (available from KYOWA Chemical Industry Co., Ltd.) as an acid trapping agent was compounded to 100 parts by weight of the precursor 3 obtained in the above description, and extrusion-kneaded by setting the rotational number at 150 rpm, the cylinder temperature of a hopper setting portion at 100° C. and all other setting temperature at 260° C. using a biaxial extruder equipped with a vent (44 mm, L/D=42.25) (made by Japan Steel Works Ltd.) to obtain an objective acrylic block copolymer containing an acid anhydride group and a carboxyl group (hereinafter, the polymer obtained is described as "the polymer 3"). At extrusion, the vent orifice was blocked. Further, at this time, an underwater cut pelletizer (CLS-6-8.1 COMPACT LAB SYSTEM, made by GALA INDUSTRIES INC.) was connected with the edge of the biaxial extruder and spherical pellets without an adherence preventive property were obtained by adding ALFLOW H-50ES (available from NOF Corporation) as an adhesion prevention agent in the circulation water of the underwater cut pelletizer.

The measurement of conversion efficiency to the acid anhydride group and the carboxyl group at a t-butyl ester site was carried out by quantifying the amount of isobutylene generated from the t-butyl group by a thermal decomposition reaction at 280° C. As a result of the measurement, the conversion efficiency of the obtained resin was at least 95%.

Preparation Example 4

Synthesis of (MMA-co-BA)-b-(BA-co-TBA)-b-(MMA-co-BA) Type Acrylic Block Copolymer (Hereinafter, Described as "the Precursor 4")

The following operations were carried out in order to obtain the polymer 4.

After a 15 L pressure resistant reactor was purged with nitrogen, 5.74 g (40 mmol) of copper bromide, 674 g (5.3 mol) of BA and 30 g (0.23 mol) of TBA were charged to start stirring. Then, a solution in which 8.0 g (22 mmol) of diethyl 2,5-dibromoadipate as an initiator was dissolved in 61.7 g of acetonitrile (treated with nitrogen bubbling) was charged thereto, and the solution was stirred for 30 minutes while raising a temperature to 75° C. When the inner temperature reached 75° C., 0.69 g (4 mmol) of pentamethyldiethylenetriamine as a ligand was added to initiate the polymerization of an acrylic polymer block. A polymerization speed was controlled by adding pentamethyldiethylenetriamine as needed. About 0.2 mL of a polymerization solution as for sampling was extracted from the polymerization solution periodically from the start of polymerization, and the conversions of BA and TBA were determined by the gas chromatogram analysis of the sampling solution. The polymerization speed was controlled by adding pentamethyldiethylenetriamine at the polymerization as needed. Pentamethyldiethylenetriamine was added 3 times in total (2.07 g in total) during the polymerization of the acrylic polymer block.

When the conversion of BA reached 94.9% and the conversion of TBA reached 95.7%, 409 g (4.1 mol) of MMA, 77 g (0.6 mol) of BA, 3.96 g (40 mmol) of copper chloride, 0.69 g (4 mmol) of pentamethyldiethylenetriamine and 906 g of toluene (treated with nitrogen bubbling) were added thereto to start the polymerization of the methacrylic polymer block.

The conversions of MMA and BA were determined in the same manner as at the polymerization of the acrylic polymer block. Sampling was carried out at charging MMA and BA and the conversions of MMA and BA were determined using this as a basis. After charging MMA and BA, the inner temperature was set at 85° C. The polymerization speed was controlled by adding pentamethyldiethylenetriamine at polymerization as needed. Pentamethyldiethylenetriamine was added 4 times in total (2.76 g in total) during the polymerization of the methacrylic polymer block. When the conversion of MMA was 90.4% and the conversion of BA was 62.0%, 2400 g of toluene was added, and the reactor was cooled with a water bath to terminate the reaction.

Toluene was added to the obtained polymerization solution, and it was diluted so that the concentration of the polymer was 25% by weight. 16.0 g of p-toluene sulfonic acid monohydrate was added to the solution to be stirred for 3 hours at a room temperature, and a precipitated solid was removed by filtration.

24.0 g of an absorbent KYOWARD 500SH (available from KYOWA Chemical Industry Co., Ltd.) was added to the obtained polymer solution, and the mixture was further stirred at a room temperature for one hour. The absorbent was filtered by a Kiriyama funnel to obtain a colorless transparent polymer solution. The solution was dried and the solvent and the residual monomer were removed to obtain the precursor 4 of the objective acrylic block copolymer.

When the GPC analysis of the obtained precursor 4 of the acrylic block copolymer was carried out, the number average molecular weight Mn was 67,078 and the molecular weight distribution Mw/Mn was 1.38.

<Reaction Forming Acid Anhydride of Precursor 4>

45 g of the precursor 4 obtained in the above description and 0.135 g of Irganox 1010 (available from Chiba Specialty Chemicals Co., Ltd.) and 0.45 g of hydrotalcite DHT-4A-2 (available from KYOWA Chemical Industry Co., Ltd.) as an acid trapping agent were melt-kneaded at 100 rpm for 20 minutes using a LABO Plasto Mill 50C150 (blade shape: roller type R60, made by TOYO SEIKI KOGYO Co., Ltd.) set at 240° C. to obtain an acrylic block copolymer containing an acid anhydride group and a carboxyl group (hereinafter, the obtained polymer is described as "the polymer 4").

The measurement of conversion efficiency to the acid anhydride group and the carboxyl group at a t-butyl ester site was carried out by quantifying the amount of isobutylene generated from the t-butyl group by a thermal decomposition reaction at by 280° C. As a result of the measurement, the conversion efficiency of the obtained resin was at least 95%.

Preparation Example 5

Synthesis of (MMA-co-BA)-b-(BA-co-MEA-co-TBA)-b-(MMA-co-BA) Type Acrylic Block Copolymer (Hereinafter, Described as "the Precursor 5")

The following operations were carried out in order to obtain the precursor 5.

After a 15 L pressure resistant reactor was purged with nitrogen, 7.89 g (55 mmol) of copper bromide, 719 g (5.6 mol) of BA, 146 g (1.1 mol) of MEA and 81 g (0.63 mol) of TBA were charged to start stirring. Then, a solution in which 11.0 g (31 mmol) of diethyl 2,5-dibromoadipate as an initiator was dissolved in 81.6 g of acetonitrile (treated with nitrogen bubbling) was charged thereto and the solution was stirred for 30 minutes while raising a temperature to 75° C. When the inner temperature reached 75° C., 0.95 g (5 mmol) of pentamethyldiethylenetriamine as a ligand was added to initiate the polymerization of an acrylic polymer block. The polymerization speed was controlled by adding pentamethyldiethylenetriamine as needed. About 0.2 mL of polymerization solution as for sampling was extracted from the polymerization solution periodically from the start of polymerization and the conversions of BA, MEA and TBA were determined by the gas chromatogram analysis of the sampling solution. Polymerization speed was controlled by adding pentamethyldiethylenetriamine at polymerization as needed. Pentamethyldiethylenetriamine was added 3 times in total (2.85 g in total) during the polymerization of the acrylic polymer block.

When the conversion of BA was 97.3%, the conversion of TBA was 97.3% and the conversion of MEA was 98.0%, 560 g (5.6 mol) of MMA, 132 g (1.0 mol) of BA, 5.44 g (55 mmol) of copper chloride, 0.95 g (5 mmol) of pentamethyldiethylenetriamine and 1292 g of toluene (treated with nitrogen bubbling) were added thereto to start the polymerization of the methacrylic polymer block.

The conversions of MMA and BA were determined in the same manner as at the polymerization of the acrylic polymer block. Sampling was carried out at charging MMA and BA and the conversions of MMA and BA were determined using this as a basis. After charging MMA and BA, the inner temperature was set at 85° C. Polymerization speed was controlled by adding pentamethyldiethylenetriamine at polymerization as needed. Pentamethyldiethylenetriamine was added 4 times in total (3.8 g in total) during the polymerization of the methacrylic polymer block. When the conversion of MMA was 90.0% and the conversion of BA was 60.8%, 2400 g of toluene was added and the reactor was cooled with a water bath to terminate the reaction.

Toluene was added to the obtained polymerization solution and it was diluted so that the concentration of the polymer was 25% by weight. 20.0 g of p-toluene sulfonic acid monohydrate was added to the solution to be stirred for 3 hours at a room temperature, and a precipitated solid was removed by filtration.

33 g of an absorbent KYOWARD 500SH (available from KYOWA Chemical Industry Co., Ltd.) was added to the obtained polymer solution and the mixture was further stirred at a room temperature for one hour. The absorbent was filtered by a Kiriyama funnel to obtain a colorless transparent polymer solution. The solution was dried and the solvent and the residual monomer were removed to obtain the precursor 5 of the objective acrylic block copolymer.

When the GPC analysis of the precursor 5 of the acrylic block copolymer was carried out, the number average molecular weight Mn was 73,948 and the molecular weight distribution Mw/Mn was 1.39.

<Reaction Forming Acid Anhydride of Precursor 5>

700 g of the precursor 5 obtained in the above description, 4.2 g of Irganox 1010 (available from Chiba Specialty Chemicals Co., Ltd.) and 7.0 g of hydrotalcite DHT-4A-2 (available from KYOWA Chemical Industry Co., Ltd.) as an acid trapping agent were melt-kneaded at about 50 rpm for 50 minutes using a DS1-5MHB-E type kneader (made by MORIYAMA Co., Ltd.) set at 260° C. to obtain an objective acrylic block copolymer containing an acid anhydride group and a carboxyl group (hereinafter, the polymer obtained is described as "the polymer 5").

The measurement of conversion efficiency to the acid anhydride group and the carboxyl group at a t-butyl ester site was carried out by quantifying the amount of isobutylene generated from the t-butyl group by a thermal decomposition reaction at by 280° C. As a result of the measurement, the conversion efficiency of the obtained resin was at least 95%.

Preparation Example 6

Synthesis of (MMA-co-MEA)-b-(BA-co-TBA)-b-(MMA-co-MEA) Type Acrylic Block Copolymer (Hereinafter, Described as "the precursor 6")

Following operations were carried out in order to obtain the precursor 6. After a 15 L pressure resistant reactor was purged with nitrogen, 8.61 g (60 mmol) of copper bromide, 968 g (7.6 mol) of BA and 43 g (0.34 mol) of TBA were charged to start stirring. Then, a solution in which 12.0 g (33 mmol) of diethyl 2,5-dibromoadipate as an initiator was dissolved in 88.7 g of acetonitrile (treated with nitrogen bubbling) was charged, and the inner solution was stirred for 30 minutes while raising a temperature to 75° C. When the inner temperature reached 75° C., 1.04 g (6 mmol) of pentamethyldiethylenetriamine as a ligand was added to initiate the polymerization of an acrylic polymer block.

About 0.2 mL of polymerization solution as for sampling was extracted from the polymerization solution periodically from the start of the polymerization, and the conversions of BA and TBA were determined by the gas chromatogram analysis of the sampling solution. A polymerization speed was controlled by adding pentamethyldiethylenetriamine as needed. Further, pentamethyldiethylenetriamine was added 3 times in total (3.12 g in total) during the polymerization of the acrylic polymer block.

When the conversion of BA reached 99.0% and the conversion of TBA reached 98.7%, 637 g (6.4 mol) of MMA, 73 g (0.56 mol) of MEA, 5.94 g (60 mmol) of copper chloride, 1.04 g (6 mmol) of pentamethyldiethylenetriamine and 1303 g of toluene (treated with nitrogen bubbling) were added thereto to start the polymerization of the methacrylic polymer block.

The conversion of MMA was determined in the same manner as at the polymerization of the acrylic polymer block. Sampling was carried out at charging MMA, and the conversion of MMA was determined using this as a basis. After charging MMA, the inner temperature was set at 85° C. Polymerization speed was controlled by adding pentamethyldiethylenetriamine at the polymerization as needed. Further, pentamethyldiethylenetriamine was added 4 times in total (4.16 g in total) during the polymerization of the methacrylic polymer block. When the conversion of MMA was 94.5%, 2400 g of toluene was added and the reactor was cooled with a water bath to terminate the reaction.

Toluene was added to the obtained reaction solution and it was diluted so that the concentration of the polymer was 25% by weight. 24.0 g of p-toluene sulfonic acid monohydrate was added to the solution to be stirred for 3 hours at a room temperature, and a precipitated solid was removed by filtration.

34.7 g of an absorbent KYOWARD 500SH (available from KYOWA Chemical Industry Co., Ltd.) was added to the obtained polymer solution, and the mixture was further stirred at a room temperature for one hour. The absorbent was filtered by a Kiriyama funnel to obtain a colorless transparent polymer solution. The solution was dried and the solvent and the residual monomer were removed to obtain the precursor 6 which was the objective acrylic block copolymer.

When the GPC analysis of the precursor 6 of the acrylic block copolymer was carried out, the number average molecular weight Mn was 74,057 and the molecular weight distribution Mw/Mn was 1.45.

<Reaction Forming Acid Anhydride of Precursor 6>

700 g of the precursor 6 obtained in the above description, 4.2 g of Irganox 1010 (available from Chiba Specialty Chemicals Co., Ltd.) and 7.0 g of hydrotalcite DHT-4A-2 (available from KYOWA Chemical Industry Co., Ltd.) as an acid trapping agent were melt-kneaded at about 50 rpm for 50 minutes using a DS1-5MHB-E kneader (made by MORIYAMA Co., Ltd.) set at 260° C. to obtain an objective acrylic block copolymer containing an acid anhydride group and a carboxyl group (hereinafter, the polymer obtained is described as "the polymer 6").

The measurement of conversion efficiency to the acid anhydride group and the carboxyl group at a t-butyl ester site was carried out by quantifying the amount of isobutylene generated from the t-butyl group by a thermal decomposition reaction at by 280° C. As a result of the measurement, the conversion efficiency of the obtained resin was at least 95%.

Preparation Example 7

Synthesis of (MMA-co-EA)-b-(BA-co-TBA)-b-(MMA-co-EA) Type Acrylic Block Copolymer (Hereinafter, Described as "the Precursor 7")

The following operations were carried out in order to obtain the precursor 7.

A 500 L reactor which was purged with nitrogen was charged with 70.19 kg of n-butyl acrylate, 4.81 kg of t-butyl acrylate and 0.625 kg of cuprous bromide to start stirring. Then, a solution in which 0.872 kg of diethyl 2,5-dibromoadipate was dissolved in 6.59 kg of acetonitrile was charged, warm water was flowed into a jacket, and the solution was stirred for 30 minutes while raising a temperature of the inner solution to 75° C. When the inner temperature reached 75° C., 75.5 g of pentamethyldiethylenetriamine was added to initiate the polymerization of an acrylic polymer block. A polymerization speed was controlled by adding pentamethyldiethylenetriamine at polymerization as needed. Pentamethyldiethylenetriamine was added 3 times in total (226.5 g in total) during the polymerization of the acrylic polymer block.

When the conversion reached 97.4%, 101.7 kg of toluene, 0.431 kg of cuprous chloride, 45.54 kg of methyl methacrylate, 9.26 kg of ethyl acrylate and 75.5 g of pentamethyldiethylenetriamine were added thereto to start the polymerization of the methacrylic polymer block. When the conversion of methyl methacrylate was 91.1%, 220 kg of toluene was added to dilute the reaction solution and the reactor was cooled to terminate the reaction. When the GPC analysis of the obtained block copolymer was carried out, the number average molecular weight Mn was 73,700 and the molecular weight distribution Mw/Mn was 1.39.

30 kg of toluene was added to the obtained block copolymer solution and the concentration of the polymer was adjusted to 25% by weight. 1.74 kg of p-toluene sulfonic acid was added to the solution, the reactor was purged with nitrogen, and the solution was stirred for 3 hours at 30° C. The reaction solution was sampled, and after confirming that the solution was colorless and transparent, 2.48 kg of RADIOLITE #3000 available from Showa Chemical Industry Co., Ltd. was added thereto. Then, the reactor was pressurized to 0.1 to 0.4 MPaG with nitrogen, and a solid was separated using a pressure filtering machine (filtration area of 0.45 m$^2$) equipped with polyester felt as a filtration material.

1.86 kg of KYOWARD 500SH was added to about 450 kg of the block copolymer solution after filtration, the reactor was purged with nitrogen and the solution was stirred at 30° C. for one hour. The reaction solution was sampled, and after confirming that the solution was neutral, the reaction was terminated. Then, the reactor was pressurized to 0.1 to 0.4 MPaG with nitrogen, and a solid was separated using a pressure filtering machine (filtration area of 0.45 m$^2$) equipped with polyester felt as a filtration material to obtain the polymer solution. 737 g of Irganox 1010 (available from Chiba Specialty Chemicals Co., Ltd.) was added to the obtained polymer solution, and dissolved.

Successively, the solvent component was evaporated from the polymer solution. SCP 100 (heat transfer area: 1 m$^2$) made by Kurimoto Ltd. was used as an evaporator. The evaporation of the polymer solution was carried out by setting heat transfer oil at the inlet of the evaporator at 180° C., the vacuum degree of the evaporator at 90 Torr, the screw rotational number at 60 rpm and the feed speed of the polymer solution at 32 kg/h. The polymer was made as strand with a dice with 4 mmφ through a discharger, it was cooled with a water vessel filled with a 3% suspension solution of ALFLOW H50ES (main component: ethylenebisstearic acid amide available from NOF Corporation), and then, columnar pellets were obtained by a pelletizer. Thus, pellets of the precursor 7 of the objective acrylic block copolymer were obtained.

<Reaction Forming Acid Anhydride of Precursor 7>

1 part by weight of hydrotalcite DHT-4A-2 (available from KYOWA Chemical Industry Co., Ltd.) as an acid trapping agent was compounded to 100 parts by weight of the precursor 7 obtained in the above description, and extrusion-kneaded by setting a rotational number at 150 rpm, the cylinder temperature at a hopper setting portion at 100° C. and all other setting temperatures at 260° C. using a biaxial extruder equipped with a vent (44 mm, L/D=42.25) (made by Japan Steel Works Ltd.) to obtain an objective acrylic block copolymer containing an acid anhydride group and a carboxyl group (hereinafter, the obtained polymer is described as "the polymer 7"). At extrusion, the vent orifice was blocked. Further, at this time, an underwater cut pelletizer (CLS-6-8.1 COMPACT LAB SYSTEM, made by GALA INDUSTRIES INC.) was connected with the edge of the biaxial extruder and spherical pellets without adherence preventing property were obtained by adding ALFLOW (trade mark) H-50ES (available from NOF Corporation) as an adhesion preventing agent in the circulation water of the underwater cut pelletizer.

The measurement of conversion efficiency to the acid anhydride group and the carboxyl group at a t-butyl ester site was carried out by quantifying the amount of isobutylene generated from the t-butyl group by a thermal decomposition reaction at 280° C. As a result of the measurement, the conversion efficiency of the obtained resin was at least 95%.

Preparation Example 8

Synthesis of (MMA-co-EA)-b-(BA-co-TBA)-b-(MMA-co-EA) Type Acrylic Block Copolymer (Hereinafter, Described as "the Precursor 8")

The following operations were carried out in order to obtaining the precursor 8.

A 500 L reactor which was purged with nitrogen was charged with 71.83 kg of n-butyl acrylate, 3.23 kg of t-butyl acrylate and 0.804 kg of cuprous bromide to start stirring. Then, a solution in which 1.12 kg of diethyl 2,5-dibromoadipate was dissolved in 6.59 kg of acetonitrile was charged, warm water was flowed into a jacket, and the solution was stirred for 30 minutes while raising the temperature of the inner solution to 75° C. When the inner temperature reached 75° C., 97.1 g of pentamethyldiethylenetriamine was added to initiate the polymerization of an acrylic polymer block. A polymerization speed was controlled by adding pentamethyldiethylenetriamine at polymerization as needed. Pentamethyldiethylenetriamine was added 3 times in total (291.3 g in total) during the polymerization of the acrylic polymer block.

When the conversion reached 99.1%, 97.6 kg of toluene, 0.555 kg of cuprous chloride, 45.29 kg of methyl methacrylate, 7.36 kg of ethyl acrylate and 97.1 g of pentamethyldiethylenetriamine were added thereto to start the polymerization of the methacrylic polymer block. When the conversion of methyl methacrylate reached 95.8%, 220 kg of toluene was added to dilute the reaction solution, and the reactor was cooled to terminate the reaction. When the GPC analysis of the obtained block copolymer was carried out, the number average molecular weight Mn was 62,400 and the molecular weight distribution Mw/Mn was 1.44.

30 kg of toluene was added to the obtained block copolymer solution, and the concentration of the polymer was adjusted to 25% by weight. 2.24 kg of p-toluene sulfonic acid was added to the solution, the inside of the reactor was purged with nitrogen, and the solution was stirred for 3 hours at 30° C. The reaction solution was sampled, and after confirming that the solution was colorless and transparent, 2.48 kg of RADIOLITE #3000 available from Showa Chemical Industry Co., Ltd. was added thereto. Then, the reactor was pressurized to 0.1 to 0.4 MPaG with nitrogen, and a solid was separated using a pressure filtering machine (filtration area of 0.45 m²) equipped with polyester felt as a filtration material.

2.44 kg of KYOWARD 500SH was added to about 450 kg of the block copolymer solution after filtration, the inside of the reactor was purged with nitrogen, and the solution was stirred at 30° C. for one hour. The reaction solution was sampled, and after confirming that the solution was neutral, the reaction was terminated. Then, the reactor was pressurized to 0.1 to 0.4 MPaG with nitrogen, and a solid was separated using a pressure filtering machine (filtration area of 0.45 m²) equipped with polyester felt as a filtration material to obtain the polymer solution. 728 g of Irganox 1010 (available from Chiba Specialty Chemicals Co., Ltd.) was added to obtained the polymer solution and dissolved.

Successively, the solvent component was evaporated from the polymer solution. SCP 100 (heat transfer area: 1 m²) made by Kurimoto Ltd. was used as an evaporator. The evaporation of the polymer solution was carried out by setting heat transfer oil at the inlet of the evaporator at 180° C., the vacuum degree of the evaporator at 90 Torr, the screw rotational number at 60 rpm and the feed speed of the polymer solution at 32 kg/h. The polymer was made as strand with a dice with 4 mmφ through a discharger, it was cooled with a water vessel filled with a 3% suspension solution of ALFLOW H50ES (main component: ethylenebisstearic acid amide available from NOF Corporation), and then columnar pellets were obtained by a pelletizer. Thus, pellets of the precursor 8 of the objective acrylic block copolymer were obtained.

<Reaction Forming Acid Anhydride of Precursor 8>

1 part by weight of hydrotalcite DHT-4A-2 (available from KYOWA Chemical Industry Co., Ltd.) as an acid trapping agent was compounded to 100 parts by weight of the precursor 8 obtained in the above description and extrusion-kneaded by setting a rotational number at 150 rpm, the cylinder temperature at a hopper setting portion at 100° C. and all other setting temperatures at 260° C. using a biaxial extruder equipped with a vent (44 mm, L/D=42.25) (made by Japan Steel Works Ltd.) to obtain an objective acrylic block copolymer containing an acid anhydride group and a carboxyl group (hereinafter, the obtained polymer is described as "the polymer 8"). At extrusion, the vent orifice was blocked. Further, at this time, an underwater cut pelletizer (CLS-6-8.1 COMPACT LAB SYSTEM, made by GALA INDUSTRIES INC.) was connected with the edge of the biaxial extruder, and spherical pellets without adhesion preventing property were obtained by adding ALFLOW (trade mark) H-50ES (available from NOF Corporation) as an adhesion preventing agent in the circulation water of the underwater cut pelletizer.

The measurement of conversion efficiency to the acid anhydride group and the carboxyl group at a t-butyl ester site was carried out by quantifying the amount of isobutylene generated from the t-butyl group by a thermal decomposition reaction at 280° C. As a result of the measurement, the conversion efficiency of the obtained resin was at least 95%.

Preparation Example 9

Synthesis of (MMA-co-EA)-b-(BA-co-TBA)-b-(MMA-co-EA) Type Acrylic Block Copolymer (Hereinafter, Described as "the Precursor 9")

The following operations were carried out in order to obtain the precursor 9.

A 500 L reactor which was purged with nitrogen was charged with 73.40 kg of n-butyl acrylate, 1.61 kg of t-butyl acrylate and 0.638 kg of cuprous bromide to start stirring. Then, a solution in which 1.12 kg of diethyl 2,5-dibromoadipate was dissolved in 6.59 kg of acetonitrile was charged, warm water was flowed into a jacket, and the solution was stirred for 30 minutes while raising a temperature of the inner solution to 75° C. When the inner temperature reached 75° C., 77.1 g of pentamethyldiethylenetriamine was added to initiate the polymerization of an acrylic polymer block. Polymerization speed was controlled by adding pentamethyldiethylenetriamine at the polymerization as needed. Pentamethyldiethylenetriamine was added 2 times in total (154.2 g in total) during the polymerization of the acrylic polymer block.

When the conversion reached 99.2%, 97.6 kg of toluene, 0.441 kg of cuprous chloride, 45.27 kg of methyl methacrylate, 7.36 kg of ethyl acrylate and 77.1 g of pentamethyldiethylenetriamine were added thereto to start the polymerization of the methacrylic polymer block. When the conversion of methyl methacrylate reached 95.4%, 220 kg of toluene was added to dilute the reaction solution and the reactor was cooled to terminate the reaction. When the GPC analysis of the obtained block copolymer was carried out, the number average molecular weight Mn was 60,400 and the molecular weight distribution Mw/Mn was 1.49.

30 kg of toluene was added to the block copolymer solution obtained, and the concentration of the polymer was adjusted to 25% by weight. 2.03 kg of p-toluene sulfonic acid was added to the solution, the inside of the reactor was purged with nitrogen, and the solution was stirred for 3 hours at 30° C. The reaction solution was sampled, and after confirming that the solution was colorless and transparent, 6.10 kg of RADIOLITE #3000 available from Showa Chemical Industry Co., Ltd. was added thereto. Then, the reactor was pressurized to 0.1 to 0.4 MPaG with nitrogen, and a solid was separated using a pressure filtering machine (filtration area of 0.45 m$^2$) equipped with polyester felt as a filtration material.

2.44 kg of KYOWARD 500SH was added to about 450 kg of the block copolymer solution after filtration, the inside of the reactor was purged with nitrogen and the solution was stirred at 30° C. for one hour. The reaction solution was sampled, and after confirming that the solution was neutral, the reaction was terminated. Then, the reactor was pressurized to 0.1 to 0.4 MPaG with nitrogen and a solid was separated using a pressure filtering machine (filtration area of 0.45 m$^2$) equipped with polyester felt as a filtration material to obtain the polymer solution. 728 g of Irganox 1010 (available from Chiba Specialty Chemicals Co., Ltd.) was added to the obtained polymer solution and dissolved.

Successively, the solvent component was evaporated from the polymer solution. SCP 100 (heat transfer area: 1 m$^2$) made by Kurimoto Ltd. was used as an evaporator. The evaporation of the polymer solution was carried out by setting a heat transfer oil at the inlet of the evaporator at 180° C., the vacuum degree of the evaporator at 90 Torr, the screw rotational number at 60 rpm and the feed speed of the polymer solution at 32 kg/h. The polymer was made as strand with a dice with 4 mmφ through a discharger, it was cooled with a water vessel filled with a 3% suspension solution of ALFLOW H50ES (main component: ethylenebisstearic acid amide available from NOF Corporation), and then, columnar pellets were obtained by a pelletizer. Thus, pellets of the precursor 9 of the objective acrylic block copolymer were obtained.

<Reaction Forming Acid Anhydride of Precursor 9>

1 part by weight of hydrotalcite DHT-4A-2 (available from KYOWA Chemical Industry Co., Ltd.) as an acid trapping agent was compounded to 100 parts by weight of the precursor 9 obtained in the above description and extrusion-kneaded by setting a rotational number at 150 rpm, the cylinder temperature at a hopper setting portion at 100° C. and all other setting temperatures at 260° C. using a biaxial extruder equipped with a vent (44 mm, L/D=42.25) (made by Japan Steel Works Ltd.) to obtain an objective acrylic block copolymer containing an acid anhydride group and a carboxyl group (hereinafter, the obtained polymer is described as "the polymer 9"). At extrusion, the vent orifice was blocked. Further, at this time, an underwater cut pelletizer (CLS-6-8.1 COMPACT LAB SYSTEM, made by GALA INDUSTRIES INC.) was connected with the edge of the biaxial extruder, and spherical pellets without adhesion preventing property were obtained by adding ALFLOW (trade mark) H-50ES (available from NOF Corporation) as an adhesion preventing agent in the circulation water of the underwater cut pelletizer.

The measurement of conversion efficiency to the acid anhydride group and the carboxyl group at a t-butyl ester site was carried out by quantifying the amount of isobutylene generated from the t-butyl group by a thermal decomposition reaction at 280° C. As a result of the measurement, the conversion efficiency of the obtained resin was at least 95%.

Preparation Example 10

Synthesis of (MMA-co-BA)-b-BA-b-(MMA-co-BA) Type Acrylic Block Copolymer (Hereinafter, Described as the Polymer 10)

The following operations were carried out in order to obtain the polymer 10.

After a 5 L separable flask as a polymerization container was purged with nitrogen, 5.7 g (40 mmol) of copper bromide was weighed and 59 g of acetonitrile (treated with nitrogen bubbling) was added thereto. After stirring by heating at 70° C. for 30 minutes, 8.0 g (22 mmol) of diethyl 2,5-dibromoadipate as an initiator and 671 g (5.2 mol) of BA were added thereto. The mixture was stirred by heating at 85° C., and 0.69 g (4.0 mmol) of pentamethyldiethylenetriamine as a ligand was added to initiate polymerization.

About 0.2 mL of polymerization solution as for sampling was extracted from the polymerization solution periodically from the start of polymerization and the conversion of BA was determined by the gas chromatogram analysis of the sampling solution. A polymerization speed was controlled by adding pentamethyldiethylenetriamine as needed. When the conversion of BA reached 94.5%, 391 g (3.9 mol) of MMA, 61 g (0.47 mol) of BA, 4.0 g (40 mmol) of copper chloride, 0.69 g (4.0 mmol) of pentamethyldiethylenetriamine and 841 g of toluene (treated with nitrogen bubbling) were added thereto. The conversions of MMA and BA were determined in the same manner. When the conversion of MMA was 90.5% and the conversion of BA was 67.1% based on the concentration of BA just after the addition of MMA/TBMA/BA, 1500 g of toluene was added thereto and the reactor was cooled with a water bath to terminate the reaction.

The reaction solution was diluted with 700 g of toluene, 16.0 g of p-toluene sulfonic acid monohydrate was added to be stirred for 3 hours at a room temperature, and a precipitated solid content was removed by filtration. 16.0 g of an absorbent KYOWARD 500SH (available from KYOWA Chemical Industry Co., Ltd.) was added to the obtained polymer solution, and the mixture was further stirred at a room temperature for one hour. The absorbent was filtered by a Kiriyama funnel to obtain a colorless transparent polymer solution. The solution was dried, and the solvent and the residual monomer were removed to obtain the objective polymer 10.

When the GPC analysis of the obtained polymer 10 was carried out, the number average molecular weight Mn was 62600 and the molecular weight distribution Mw/Mn was 1.44.

Preparation Example 11

Synthesis of (MMA-co-BA)-b-BA-b-(MMA-co-BA) Type Acrylic Block Copolymer (Hereinafter, Described as the Polymer 11)

The following operations were carried out in order to obtain the polymer 11.

After a 5 L separable flask as a polymerization container was purged with nitrogen, 11.3 g (78.5 mmol) of copper bromide was weighed and 180 ml of acetonitrile (dried with molecular sieves 3A and then treated with nitrogen bubbling) was added thereto. After stirring by heating at 70° C. for 5 minutes, it was cooled to a room temperature again, and 5.7 g (15.7 mmol) of diethyl 2,5-dibromoadipate as an initiator and 804.6 g (900.0 ml) of n-butyl acrylate were added. The mixture was stirred by heating at 80° C., and 1.6 ml (7.9 mmol) of pentamethyldiethylenetriamine as a ligand was added to initiate polymerization. About 0.2 ml of a polymerization solution as for sampling was extracted from the polymerization solution periodically from the start of polymerization and the conversion of butyl acrylate was determined by the gas chromatogram analysis of the sampling solution. A polymerization speed was controlled by adding pentamethyldiethylenetriamine as needed. When the conversion of n-butyl acrylate reached 95%, 345.7 g (369.3 ml) of methyl methacrylate, 7.8 g (78.5 mmol) of copper chloride, 1.6 ml (7.9 mmol) of pentamethyldiethylenetriamine and 1107.9 ml of toluene (dried with molecular sieves 3A and then treated with nitrogen bubbling) were added thereto. The conversion of methyl methacrylate was determined in the same manner. When the conversion of methyl methacrylate was 85% and the conversion of n-butyl acrylate was 98%, 1500 ml of toluene was added and the reactor was cooled with a water bath to terminate the reaction. The polymerization solution was always green during the reaction.

The reaction solution was diluted with 4000 ml of toluene, 22.1 g of p-toluene sulfonic acid monohydrate was added to be stirred at 23° C. for 3 hours. After removing the insoluble portion precipitated by filtering with a Kiriyama funnel, 9.7 g of an absorbent KYOWARD 500SH was added to the polymer solution and the mixture was further stirred at 23° C. for 3 hours. The absorbent was filtered by a Kiriyama funnel to obtain a colorless transparent polymer solution. The solution was dried, and the solvent and the residual monomer were removed to obtain the objective polymer 11.

When the GPC analysis of the obtained polymer 11 was carried out, the number average molecular weight Mn was 119,200 and the molecular weight distribution Mw/Mn was 1.51. Further, when compositional analysis by NMR was carried out, it was BA/MMA=72/28 (% by weight).

Preparation Example 12

Synthesis of (MMA-co-BA)-b-BA-b-(MMA-co-BA) Type Acrylic Block Copolymer (Hereinafter, Described as "the Polymer 12")

The following operations were carried out in order to obtain the polymer 12.

After a 2 L separable flask as a polymerization container was purged with nitrogen, 2.7 g (19 mmol) of copper bromide was weighed and 31 g of acetonitrile (treated with nitrogen bubbling) was added thereto. After stirring by heating at 70° C. for 30 minutes, 2.7 g (7.5 mmol) of diethyl 2,5-dibromoadipate as an initiator and 358 g (2.8 mol) of BA were added. The mixture was stirred by heating at 85° C., and 0.33 g (1.9 mmol) of pentamethyldiethylenetriamine as a ligand was added to initiate polymerization.

About 0.2 mL of polymerization solution as for sampling was extracted from the polymerization solution periodically from the start of the polymerization, and the conversion of BA was determined by the gas chromatogram analysis of the sampling solution. Polymerization speed was controlled by adding pentamethyldiethylenetriamine as needed. When the conversion of BA is 85.5%, 193 g (1.9 mol) of MMA, 1.87 g (19 mmol) of copper chloride, 0.33 (1.9 mmol) of pentamethyldiethylenetriamine and 349 g of toluene (treated with nitrogen bubbling) were added thereto. The conversions of MMA and BA were determined in the same manner. When the conversion of MMA was 90.6% and the conversion of BA was 94.0%, 600 g of toluene was added and the reactor was cooled with a water bath to terminate the reaction.

Toluene was added to the obtained reaction solution and it was diluted so that the concentration of the polymer was 25% by weight. 7.6 g of p-toluene sulfonic acid monohydrate was added to the solution to be stirred at a room temperature for 3 hours, and a precipitated solid was removed by filtration. 11.0 g of an absorbent KYOWARD 500SH (available from KYOWA Chemical Industry Co., Ltd.) was added to the obtained polymer solution and the mixture was further stirred at a room temperature for one hour. The absorbent was filtered by a Kiriyama funnel to obtain a colorless transparent polymer solution. The solution was dried and the solvent and the residual monomer were removed to obtain the objective polymer 12.

When the GPC analysis of the obtained polymer 12 was carried out, the number average molecular weight Mn was 92,713 and the molecular weight distribution Mw/Mn was 1.33.

Preparation Example 13

Synthesis of (MMA-co-BA-co-MEA)-b-(BA-co-MEA)-b-(MMA-co-BA-co-MEA) Type Acrylic Block Copolymer (Hereinafter, Described as "the Polymer 13")

The following operations were carried out in order to obtain the polymer 13.

A 500 L reactor which was purged with nitrogen was charged with 53.7 kg of butyl acrylate, 27.2 kg of 2-methoxyethyl acrylate and 0.649 kg of cuprous bromide to start stirring. Successively, warm water was flowed into a jacket, and the temperature of the inner solution was raised to 70° C. to be kept for 30 minutes. Then, a solution in which 0.905 kg of diethyl 2,5-dibromoadipate was dissolved in 6.82 kg of acetonitrile was charged, and a temperature was raised to 75° C. When the inner temperature reached 75° C., 94.5 ml of pentamethyldiethylenetriamine was added to initiate the polymerization of the first block.

When the conversion reached 95%, 79.1 kg of toluene, 0.448 kg of cuprous chloride, 43.5 kg of methyl methacrylate and 94.5 ml of pentamethyldiethylenetriamine were added thereto to start the polymerization of the second block. When the conversion of MMA reached 90%, 104 kg of toluene was added to dilute the reaction solution and the reactor was cooled to terminate the reaction. When the GPC analysis of the obtained block copolymer was carried out, the number average molecular weight Mn was 67,152 and the molecular weight distribution Mw/Mn was 1.37.

160 kg of toluene was added to the obtained block copolymer solution, and the concentration of the polymer was adjusted to 25% by weight. 1.29 kg of p-toluene sulfonic acid was added to the solution, the inside of the reactor was purged with nitrogen, and the solution was stirred for 3 hours at 30° C. The reaction solution was sampled, and after confirming that the solution was colorless and transparent, 2.39 kg of RADIOLITE #3000 available from Showa Chemical Industry Co., Ltd. was added thereto. Then, the reactor was pressurized to 0.1 to 0.4 MPaG with nitrogen, and a solid was separated using a pressure filtering machine (filtration area of 0.45 m$^2$) equipped with polyester felt as a filtration material.

1.79 kg of KYOWARD 500SH was added to about 478 kg of the block copolymer solution obtained after filtration, the inside of the reactor was purged with nitrogen, and the solution was stirred at 30° C. for one hour. The reaction solution was sampled, and after confirming that the solution was neutral, the reaction was terminated. Then, the reactor was pressurized to 0.1 to 0.4 MPaG with nitrogen, and a solid was separated using a pressure filtering machine (filtration area of 0.45 m$^2$) equipped with polyester felt as a filtration material to obtain the polymer solution.

512 g of Irganox 1010 (available from Chiba Specialty Chemicals Co., Ltd.) was added to the obtained polymer solution and dissolved.

Successively, the solvent component was evaporated from the polymer solution. SCP 100 (heat transfer area: 1 m$^2$) made by Kurimoto Ltd. was used as an evaporator. The evaporation of the polymer solution was carried out by setting heat transfer oil at the inlet of the evaporator at 180° C., the vacuum degree of the evaporator at 90 Torr, the screw rotational number at 60 rpm and the feed speed of the polymer solution at 32 kg/h. The polymer was made as strand through a dice with 4 mmφ and columnar pellets were obtained by a pelletizer after cooling with a water bath (the polymer 13).

Example 1

A proportion of 5 parts by weight of ARUFON XG4010 (available from TOAGOSEI Co., Ltd.) of an acrylic polymer which was all acryl and contained at least 1.1 (an approximate value of 4 (from the catalogue)) of epoxy groups in a molecule, 0.5 part by weight of carbon black (ASAHI #15; available from Asahi Carbon Co., Ltd.) and 0.3 part by weight of Irganox 1010 (available from Chiba Specialty Chemicals Co., Ltd.) based on 100 parts by weight (38 g) of the polymer 1 obtained in Preparation Example 1 was melt-kneaded at 100 rpm for 15 minutes using a LABO Plasto Mill 50C150 (blade shape: roller type R60, made by TOYO SEIKI KOGYO Co., Ltd.) set at 100° C. to obtain a block sample.

The obtained sample was molded at a set temperature of 200° C. for 5 minutes with a hot press (a compression molding machine NSF-50 made by Shinto Metal Industries Ltd.) using a skin crepe metal plate and molded articles for evaluation having a thickness of 1 mm on which the skin crepe pattern was transcribed were obtained. Ethanol resistance, oil resistance, urethane adhesivity and heat resistance test were measured for these molded articles. The result is shown in Table 1. Further, the powder slash property test was carried out for powder obtained by pulverizing the block sample obtained in the above description. Further, an insoluble content ratio (% by weight) was measured by using a powder before the powder slash molding and a sheet after molding. The result is shown in Table 1.

Example 2

A proportion of 5 parts by weight of ARUFON XG4010 (available from TOAGOSEI Co., Ltd.) of an acrylic polymer which was all acryl and contained at least 1.1 (an approximate value of 4 (from the catalogue)) of epoxy groups in a molecule, 20 parts of calcium carbonate (SOFTON 3200; available from Bihoku Funka Kogyo Co., Ltd.), 0.5 part by weight of carbon black (ASAHI #15; available from Asahi Carbon Co., Ltd.) and 0.3 part by weight of Irganox 1010 (available from Chiba Specialty Chemicals Co., Ltd.) based on 100 parts by weight (38 g) of the polymer 1 obtained in Preparation Example 1 was melt-kneaded at 100 rpm for 15 minutes using a LABO Plasto Mill 50C150 (blade shape: roller type R60, made by TOYO SEIKI KOGYO Co., Ltd.) set at 100° C. to obtain a block sample.

The obtained sample was molded at a set temperature of 200° C. for 5 minutes with a hot press (a compression molding machine NSF-50 made by Shinto Metal Industries Ltd.) using a skin crepe metal plate and molded articles for evaluation having a thickness of 1 mm on which the skin crepe pattern was transcribed were obtained. Ethanol resistance, oil resistance, urethane adhesivity and heat resistance test were measured for these molded articles. The result is shown in Table 1. Further, the powder slash property test was carried out for powder obtained by pulverizing the block sample obtained in the above description. Further, an insoluble content ratio (% by weight) was measured by using a powder before the powder slash molding and a sheet after molding. The result is shown in Table 1.

Example 3

The operations in the same manner as Example 1 were carried out except that the compounding parts of XG4010 and SOFTON 3200 of Example 2 were changed, and a block sample was obtained to be evaluated. The result is shown in Table 1.

Example 4

A proportion of 10 parts by weight of ARUFON XG4010 (available from TOAGOSEI Co., Ltd.) of an acrylic polymer which was all acryl and contained at least 1.1 (an approximate value of 4 (from the catalogue)) of epoxy groups in a molecule, 43 parts of calcium carbonate (SOFTON 3200; available from Bihoku Funka Kogyo Co., Ltd.) and 1.4 parts by weight of carbon black (ASAHI #15; available from Asahi Carbon Co., Ltd.) based on 100 parts by weight (700 g) of the polymer 2 obtained in Preparation Example 2 was melt-kneaded at about 50 rpm for about 30 minutes using a DS1-5MHB-E kneader (made by MORIYAMA Co., Ltd.) set at 100° C. to obtain a block sample. At this time, a rotational number was suitably lowered at a time at which resin temperature was going to exceed 130° C.

The obtained sample was molded at a set temperature of 200° C. for 5 minutes with a hot press (a compression molding machine NSF-50 made by Shinto Metal Industries Ltd.) using a skin crepe metal plate and molded articles for evaluation having a thickness of 1 mm on which the skin crepe pattern was transcribed were obtained. Ethanol resistance, oil resistance, urethane adhesivity, heat resistance test, and weight marking test were measured for these molded articles. The result is shown in Table 1. Further, the powder slash property test was carried out for powder obtained by pulverizing the block sample obtained in the above description. Further, an insoluble content ratio (% by weight) was measured by using a powder before the powder slash molding and a sheet after molding. The result is shown in Table 1.

Example 5

The operations in the same manner as Example 1 were carried out except that the compounding parts of ARUFON XG4010 (available from TOAGOSEI Co., Ltd.) of Example 4 was changed to 5 parts by weight, and a block sample was obtained to be evaluated. The result is shown in Table 1.

Example 6

The operations in the same manner as Example 4 were carried out except that the polymer 2 of Example 4 was changed to the polymer 3 of Preparation Example 3, and a block sample was obtained to be evaluated. The result is shown in Table 1.

Example 7

The operations in the same manner as Example 4 were carried out except that the polymer 2 of Example 4 was changed to the polymer 4 of Preparation Example 4, and a block sample was obtained to be evaluated. The result is shown in Table 1.

Example 8

The operations in the same manner as Example 4 were carried out except that the polymer 2 of Example 4 was changed to the polymer 5 of Preparation Example 5, and a block sample was obtained to be evaluated. The result is shown in Table 1.

Example 9

A proportion of 10 parts by weight of ARUFON XG4010 (available from TOAGOSEI Co., Ltd.) of an acrylic polymer which was all acryl and contained at least 1.1 (an approximate value of 4 (from the catalogue)) of epoxy groups in a molecule, 43 parts of calcium carbonate (SOFTON 3200; available from Bihoku Funka Kogyo Co., Ltd.) and 1.4 parts by weight of carbon black (ASAHI #15; available from Asahi Carbon Co., Ltd.) based on 100 parts by weight (700 g) of the polymer 6 obtained in Preparation Example 6 was melt-kneaded at about 50 rpm for about 30 minutes using a DS1-5MHB-E kneader (made by MORIYAMA Co., Ltd.) set at 100° C. to obtain a block sample. At this time, a rotational number was suitably lowered at a time at which resin temperature was going to exceed 130° C.

The obtained sample was molded at a set temperature of 200° C. for 5 minutes with a hot press (a compression molding machine NSF-50 made by Shinto Metal Industries Ltd.) using a skin crepe metal plate and molded articles for evaluation having a thickness of 1 mm on which the skin crepe pattern was transcribed were obtained. Scratch test was carried out on these molded articles. The result is shown in Table 1. Further, the powder slash property test was carried out for powder obtained by pulverizing the block sample obtained in the above description. Ethanol resistance, oil resistance, urethane adhesivity and heat resistance test were measured for the sheet obtained in the powder slash property test. The result is shown in Table 1.

Example 10

A proportion of 10 parts by weight of ARUFON XG4010 (available from TOAGOSEI Co., Ltd.) of an acrylic polymer, 43 parts of calcium carbonate (SOFTON 3200; available from Bihoku Funka Kogyo Co., Ltd.) and 1.4 parts by weight of carbon black (ASAHI #15; available from Asahi Carbon Co., Ltd.) based on 100 parts by weight of the polymer 7 obtained in Preparation Example 7 was extrusion-kneaded at a rotational number of 100 rpm and all cylinder temperature of 80° C. using a biaxial extruder equipped with a vent LABOTEX30HSS (made by Japan Steel Works Ltd.) to obtain a pellet sample.

The obtained sample was molded at a set temperature of 200° C. for 5 minutes with a hot press (a compression molding machine NSF-50 made by Shinto Metal Industries Ltd.) using a skin crepe metal plate and molded articles for evaluation having a thickness of 1 mm on which the skin crepe pattern was transcribed were obtained. Scratch test was carried out on these molded articles. The result is shown in Table 1. Further, the powder slash property test was carried out for powder obtained by pulverizing the block sample obtained in the above description. Ethanol resistance, oil resistance, urethane adhesivity and heat resistance test were measured for the sheet obtained in the powder slash property test. The result is shown in Table 1.

Example 11

The operations in the same manner as Example 10 were carried out except that the polymer 7 of Example 10 was changed to the polymer 8, and a pellet sample and a molded article were obtained and the evaluation was carried out in the same manner for these. The result is shown in Table 1.

Example 12

Operation in the same manner as Example 10 was carried out except that the polymer 7 of Example 10 was changed to the polymer 9, and a pellet sample and a molded article were obtained and evaluation was similarly carried out for these. The result is shown in Table 1.

Comparative Example 1

A proportion of 0.5 part by weight of carbon black (ASAHI #15; available from Asahi Carbon Co., Ltd.) and 0.3 part by weight of Irganox 1010 (available from Chiba Specialty Chemicals Co., Ltd.) based on 100 parts by weight (38 g) of the polymer 10 obtained in Preparation Example 10 was melt-kneaded at 100 rpm for 15 minutes using a LABO Plasto Mill 5OC150 (blade shape: roller type R60, made by TOYO SEIKI KOGYO Co., Ltd.) set at 190° C. to obtain a block sample.

The obtained sample was molded at a set temperature of 200° C. for 5 minutes with a hot press (a compression molding machine NSF-50 made by Shinto Metal Industries Ltd.) using a skin crepe metal plate and molded articles for evaluation having a thickness of 1 mm on which the skin crepe pattern was transcribed were obtained. Ethanol resistance, oil resistance, urethane adhesivity and heat resistance test were measured for these molded articles. The result is shown in Table 1. Further, the powder slash property test was carried out for the powder obtained by pulverizing the block sample obtained in the above description. The result is shown in Table 2. Further, an insoluble content ratio (% by weight) was measured by using a powder before the powder slash molding and a sheet after molding. It is clear that powder slash moldability is excellent, but heat resistance is inferior.

Comparative Example 2

43 Parts of calcium carbonate (SOFTON 3200; available from Bihoku Funka Kogyo Co., Ltd.), 1.4 parts by weight of carbon black (ASAHI #15; available from Asahi Carbon Co., Ltd.) and 0.6 part by weight of Irganox 1010 (available from Chiba Specialty Chemicals Co., Ltd.) based on 100 parts by weight of the polymer pellet 10 obtained in Preparation Example 10 were compounded, the mixture was discharged as strand at a screw rotational number of 100 rpm and a cylinder temperature of 80° C. using a biaxial extruder equipped with a vent LABOTEX30HSS (made by Japan Steel Works Ltd.), and successively, columnar pellets were formed by a pelletizer.

The obtained sample was molded at a set temperature of 200° C. for 5 minutes with a hot press (a compression molding machine NSF-50 made by Shinto Metal Industries Ltd.) using a skin crepe metal plate and molded articles for evaluation having a thickness of 1 mm on which the skin crepe pattern was transcribed were obtained. Ethanol resistance, oil resistance, urethane adhesivity, heat resistance test, and weight marking test were measured for these molded articles. The result is shown in Table 1. Further, the powder slash property test was carried out for powder obtained by pulverizing the pellet obtained in the above description. The result is shown in Table 2. It is clear that the powder is excellent in the powder slash moldability but the molded article is inferior in heat resistance and strain restorability.

Comparative Example 3

The operations in the same manner as Comparative Example 1 were carried out except that the polymer 11 was used in place of the polymer 10 of Comparative Example 1, and a block sample was obtained to be evaluated. The result is shown in Table 2. It is clear that the molded article is excellent in heat resistance but the powder is inferior in powder slash moldability.

Comparative Example 4

The operations in the same manner as Comparative Example 2 were carried out except that the polymer 11 of Preparation Example 11 was used in place of the polymer 10 of Comparative Example 2, and pellets and a molded article were obtained to be evaluated in the same manner. The result is shown in Table 2. It is grasped that the molded article is excellent in heat resistance but the powder is inferior in powder slash moldability.

Comparative Example 5

The operations in the same manner as Comparative Example 2 were carried out except that the polymer 12 of Preparation Example 12 was used in place of the polymer 10 of Comparative Example 2, and pellets and a molded article were obtained to be evaluated in the same manner. The result is shown in Table 2. It is clear that the molded article is excellent in heat resistance but the powder is inferior in powder slash moldability.

Comparative Example 6

Operation in the same manner as Comparative Example 2 was carried out except that the polymer 13 of Preparation Example 13 was used in place of the polymer 10 of Comparative Example 2, and pellets and a molded article were obtained to be similarly evaluated. The result is shown in Table 2. It is grasped that the powder is superior in powder slash moldability and the molded article is inferior in heat resistance.

TABLE 1

| | Ex. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Polymer 1 | 100 | 100 | 100 | | | | | | | | | |
| Polymer 2 | | | | 100 | 100 | | | | | | | |
| Polymer 3 | | | | | | 100 | | | | | | |
| Polymer 4 | | | | | | | 100 | | | | | |
| Polymer 5 | | | | | | | | 100 | | | | |
| Polymer 6 | | | | | | | | | 100 | | | |
| Polymer 7 | | | | | | | | | | 100 | | |
| Polymer 8 | | | | | | | | | | | 100 | |
| Polymer 9 | | | | | | | | | | | | 100 |
| XG4010 | 5 | 5 | 10 | 10 | 5 | 10 | 10 | 10 | 10 | 10 | 10 | 10 |
| SOFTON 3200 | | 20 | 40 | 40 | 40 | 40 | 40 | 40 | 43 | 43 | 43 | 43 |
| ASAHI #15 | 0.5 | 0.5 | 0.5 | 0.5 | 0.5 | 0.5 | 0.5 | 0.5 | 1.4 | 1.4 | 1.4 | 1.4 |
| Ethanol resistance | ○ | ○ | ○ | ○ | ○ | ○ | ○ | Δ | ○ | ○ | ○ | ○ |
| Oil resistance | ○ | ○ | ○ | ○ | ○ | ○ | ○ | ○ | ○ | ○ | ○ | ○ |
| Heat resistance | ○ | ○ | ○ | ○ | ○ | ○ | ○ | ○ | ○ | ○ | ○ | ○ |
| Urethane adhesion property | ○ | ○ | ○ | ○ | ○ | ○ | ○ | ○ | ○ | ○ | ○ | ○ |
| Powder slash property | ○ | ○ | ○ | Δ | Δ | Δ | ○ | ○ | ○ | ○ | ○ | ○ |
| Insoluble content ratio before molding (% by weight) | 0 | 0 | 0 | — | — | — | — | — | — | — | — | — |
| Insoluble content ratio after molding (% by weight) | 66 | 73 | 91 | — | — | — | — | — | — | — | — | — |

TABLE 2

| | Com. Ex. | | | | | |
|---|---|---|---|---|---|---|
| | 1 | 2 | 3 | 4 | 5 | 6 |
| Polymer 10 | 100 | 100 | | | | |
| Polymer 11 | | | 100 | 100 | | |
| Polymer 12 | | | | | 100 | |
| Polymer 13 | | | | | | 100 |
| XG4010 | | | | | | |
| SOFTON 3200 | | 40 | | 40 | 40 | 40 |
| ASAHI #15 | 0.5 | 0.5 | 0.5 | 0.5 | 0.5 | 0.5 |

TABLE 2-continued

|  | Com. Ex. | | | | | |
| --- | --- | --- | --- | --- | --- | --- |
|  | 1 | 2 | 3 | 4 | 5 | 6 |
| Ethanol resistance | ◯ | ◯ | ◯ | ◯ | ◯ | Δ |
| Oil resistance | ◯ | ◯ | ◯ | ◯ | ◯ | ◯ |
| Heat resistance | X | X | ◯ | ◯ | ◯ | X |
| Urethane adhesion property | Δ | Δ | Δ | Δ | Δ | Δ |
| Powder slash property | ◯ | ◯ | X | X | X | ◯ |
| Insoluble content ratio before molding (% by weight) | 0 | 0 | 0 | 0 | 0 | 0 |
| Insoluble content ratio after molding (% by weight) | 0 | 0 | 0 | 0 | 0 | 0 |

As cleared from Table 1 (Examples 1 to 12) and Table 2 (Comparative Examples 1 to 6), it is clear that the thermoplastic elastomer composition of the present invention is excellent in powder slash moldability, and additionally, improves the heat resistance of the molded article obtained by a crosslinking reaction (the increase of insoluble content ratio) in comparison with only a block copolymer. Further, it is clear that it is also excellent in ethanol resistance and oil resistance. Further, when the obtained sheet is used as a superficial skin material for an automobile, it is required to adhere with polyurethane generally used as a substrate, but it is clear that the sheet is favorably adhered.

INDUSTRIAL APPLICABILITY

Since the molded article obtained by molding the thermoplastic elastomer composition of the present invention is excellent in heat resistance, weather resistance, chemical resistance, adhesivity, flexibility, abrasion resistance, it can be used as materials having purposes such as a superficial material, a touch material, an appearance material, an abrasive resistant material, an oil resistant material, a dumping material and an adherent material; as arbitrary shapes such as a sheet, a flat panel, a film, a small size molded article, a large size molded article and the other shapes; further, as parts such as panels, steerings, grips and switches; and further as a sealing material. Their uses are not particularly limited, but uses for an automobile, for home electronics products or for electric products for office supplies are exemplified. Examples thereof are a superficial skin material for an automobile, a touch material for an automobile, an appearance material for an automobile, panels for an automobile, steerings for an automobile, grips for an automobile, switches for an automobile and panels for electric products at home or office, switches for electric products at home or office. Among those, it is preferably used for a superficial skin for an automobile interior.

The invention claimed is:

1. A molded article, comprising an acrylic block copolymer (A) which comprises a methacrylic polymer block (a) and an acrylic polymer block (b), wherein at least one of polymer blocks among the methacrylic polymer block (a) and the acrylic polymer block (b) has an acid anhydride group and/or a carboxyl group, and an acrylic polymer (B) having 1.1 or more of epoxy groups in one molecule, wherein the acid anhydride group and/or the carboxyl group is reacted with the epoxy group at molding, and the acrylic block copolymer (A) is crosslinked.

2. The molded article of claim 1, wherein the acid anhydride group and/or the carboxyl group exist in the main chain of the acrylic block copolymer (A) and the acid anhydride group is represented by the general formula (1):

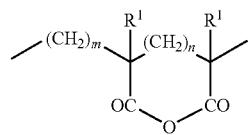

(wherein R' is hydrogen or a methyl group and may be the same or different, n is an integer of 0 to 3 and m is an integer of 0 or 1).

3. The molded article of claims 1 or 2, wherein the acrylic block copolymer (A) comprises 10 to 60% by weight of the methacrylic polymer block (a) in which a methacrylic polymer is the main component and 90 to 40% by weight of the acrylic polymer block (b) in which an acrylic polymer is the main component.

4. The molded article of claim 1, wherein the acrylic polymer block (b) comprises 50 to 100% by weight of at least one monomer selected from the group consisting of n-butyl acrylate, ethyl acrylate and 2-methoxyethyl acrylate and 50 to 0% by weight of other acrylate ester and/or other vinyl monomer copolymerizable with these monomers.

5. The molded article of claim 1, wherein the number average molecular weight measured by gel permeation chromatography of the acrylic block copolymer (A) is 30,000 to 200,000.

6. The molded article of claim 1, wherein a ratio (Mw/Mn) of the weight average molecular weight (Mw) to the number average molecular weight (Mn) measured by gel permeation chromatography of the acrylic block copolymer (A) is 1.8 or less.

7. The molded article of claim 1, wherein the acrylic block copolymer (A) is a block copolymer produced by atom transfer radical polymerization.

8. The molded article of claim 1, wherein the glass transition temperature of the methacrylic polymer block (a) is 25 to 130° C.

9. The molded article of claim 1, wherein the weight average molecular weight of the acrylic polymer (B) is 30,000 or less.

10. The molded article of claim 1, wherein a glass transition temperature of the acrylic polymer (B) is at most 100° C.

11. The molded article of claim 1, wherein the acrylic polymer (B) comprises 50 to 100% by weight of at least one monomer selected from the group consisting of n-butyl acrylate, ethyl acrylate and 2-methoxyethyl acrylate and 50 to 0% by weight of other acrylate ester and/or other vinyl monomer copolymerizable with these monomers.

12. The molded article of claim 1, wherein the weight average molecular weight of the acrylic polymer (B) is 500 to 10,000.

13. The molded article of claim 1, wherein 5 to 200 parts by weight of a filler is further added based on 100 parts by weight of the acrylic block copolymer.

14. The molded article of claim 1, wherein 0.1 to 20 parts by weight of a lubricant is further added based on 100 parts by weight of the acrylic block copolymer.

15. The molded article of claim 1, which is obtained by powder slush molding.

16. A superficial skin for an automobile interior, which comprises the molded article of claim 1.

* * * * *